Aug. 3, 1965 J. BOLSEY 3,199,117
COUNTER AND CONTROL STRUCTURES FOR MOTION PICTURE CAMERAS
Filed April 21, 1960 13 Sheets-Sheet 1

INVENTOR.
Jacques Bolsey
BY Michael J. Striker
Atty

Aug. 3, 1965  J. BOLSEY  3,199,117
COUNTER AND CONTROL STRUCTURES FOR MOTION PICTURE CAMERAS
Filed April 21, 1960  13 Sheets-Sheet 2

INVENTOR.
Jacques Bolsey
BY Michael S. Striker
Atty

Aug. 3, 1965     J. BOLSEY     3,199,117
COUNTER AND CONTROL STRUCTURES FOR MOTION PICTURE CAMERAS
Filed April 21, 1960     13 Sheets-Sheet 3

INVENTOR.
Jacques Bolsey
BY Michael S. Striker
Atty

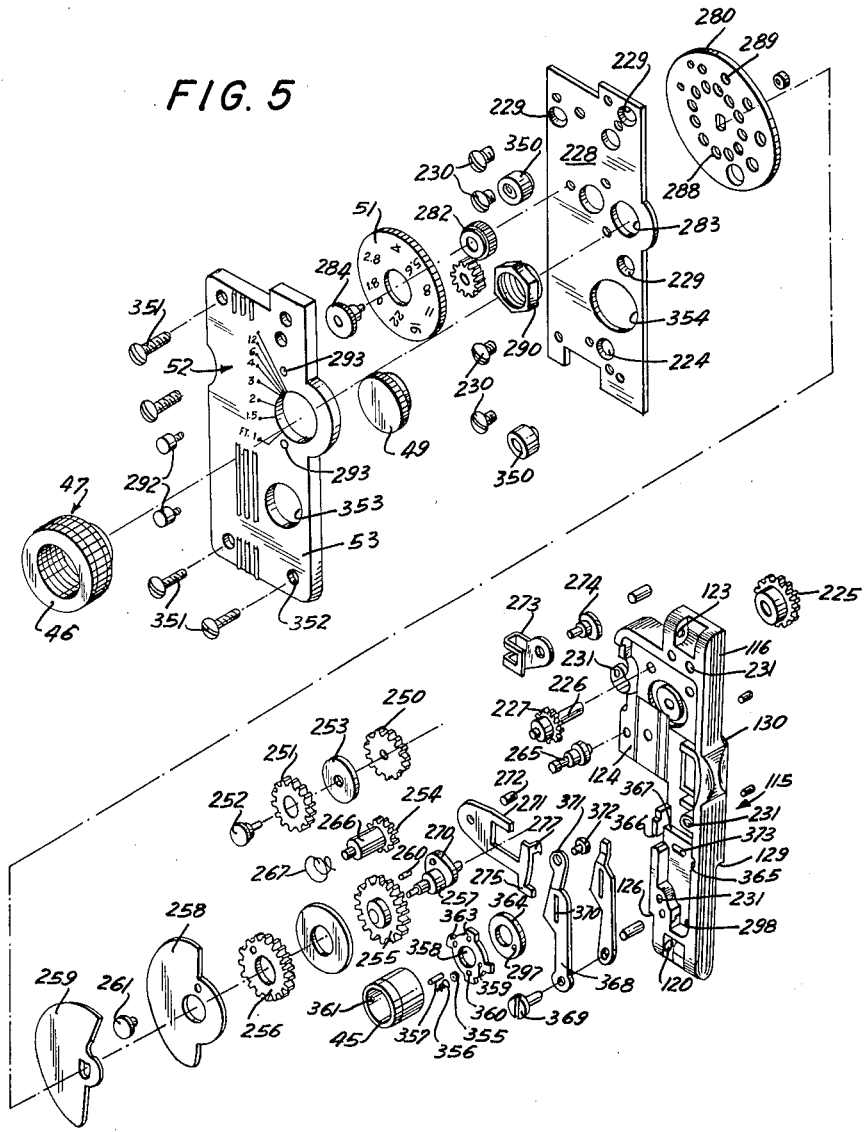

Aug. 3, 1965 J. BOLSEY 3,199,117
COUNTER AND CONTROL STRUCTURES FOR MOTION PICTURE CAMERAS
Filed April 21, 1960 13 Sheets-Sheet 5
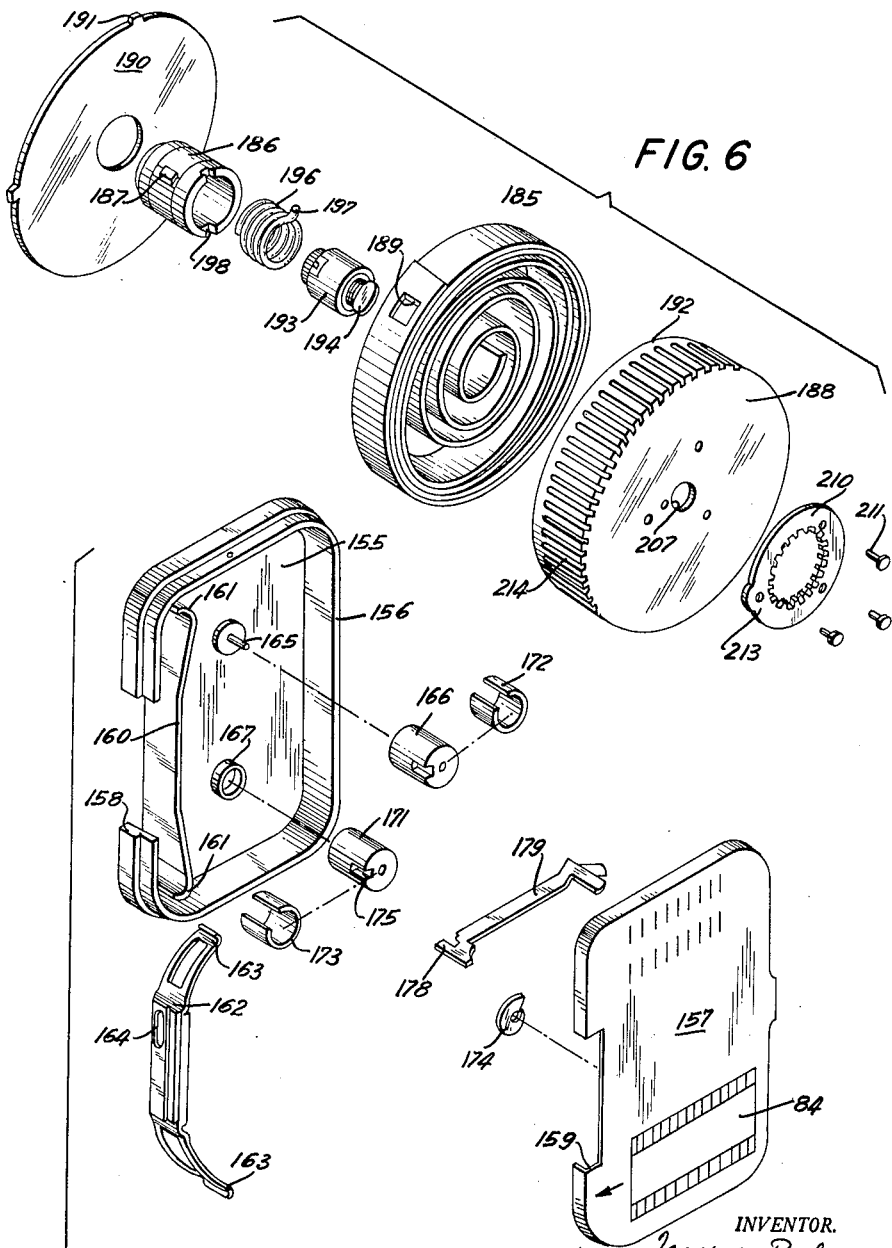

Aug. 3, 1965  J. BOLSEY  3,199,117
COUNTER AND CONTROL STRUCTURES FOR MOTION PICTURE CAMERAS
Filed April 21, 1960  13 Sheets-Sheet 6

INVENTOR.
Jacques Bolsey
BY Michael S. Striker
Atty

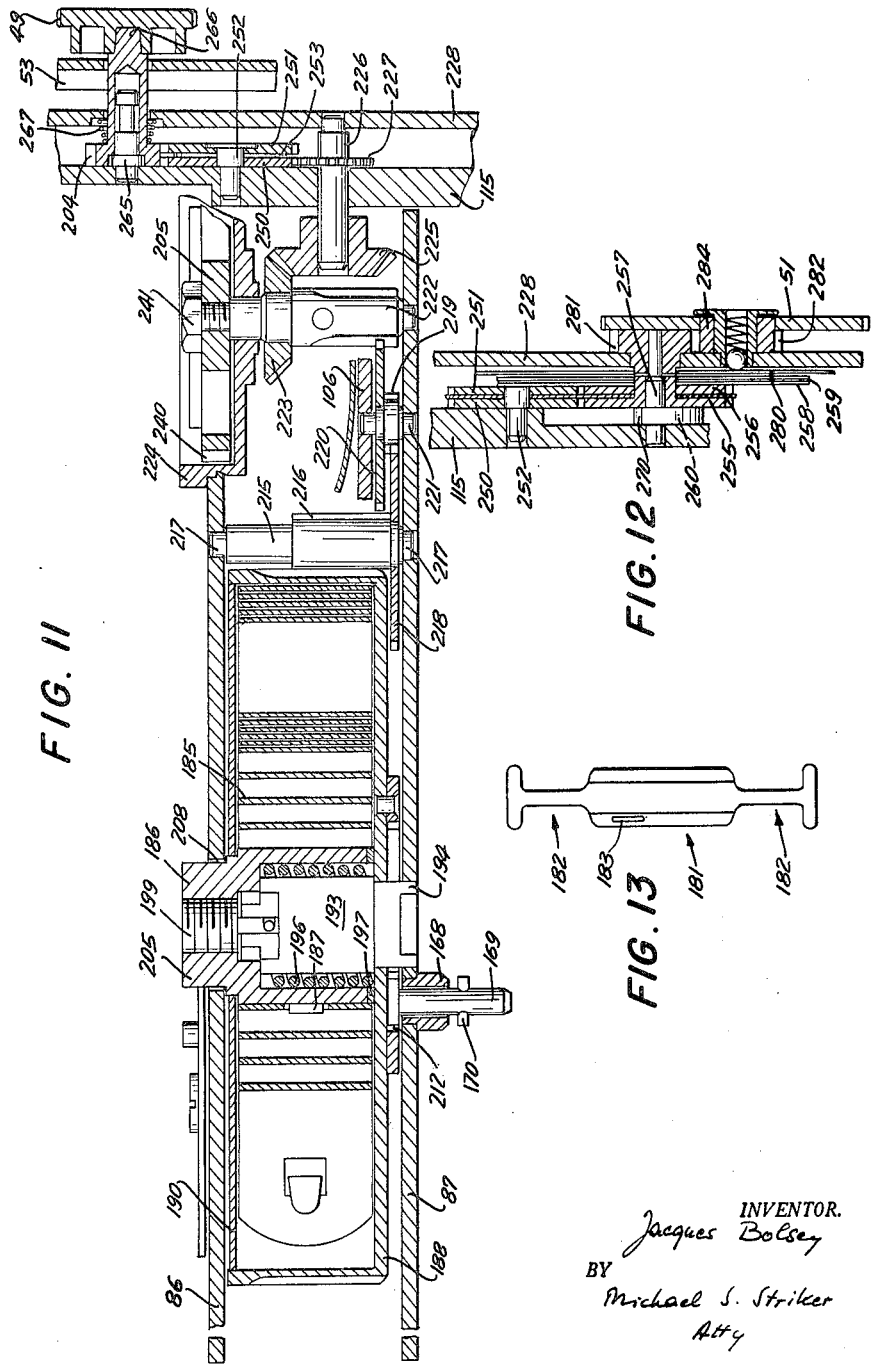

Aug. 3, 1965 J. BOLSEY 3,199,117
COUNTER AND CONTROL STRUCTURES FOR MOTION PICTURE CAMERAS
Filed April 21, 1960 13 Sheets-Sheet 9
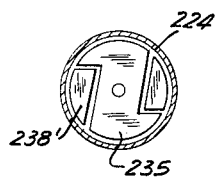
FIG. 15
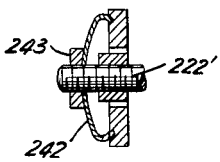
FIG. 16
FIG. 17
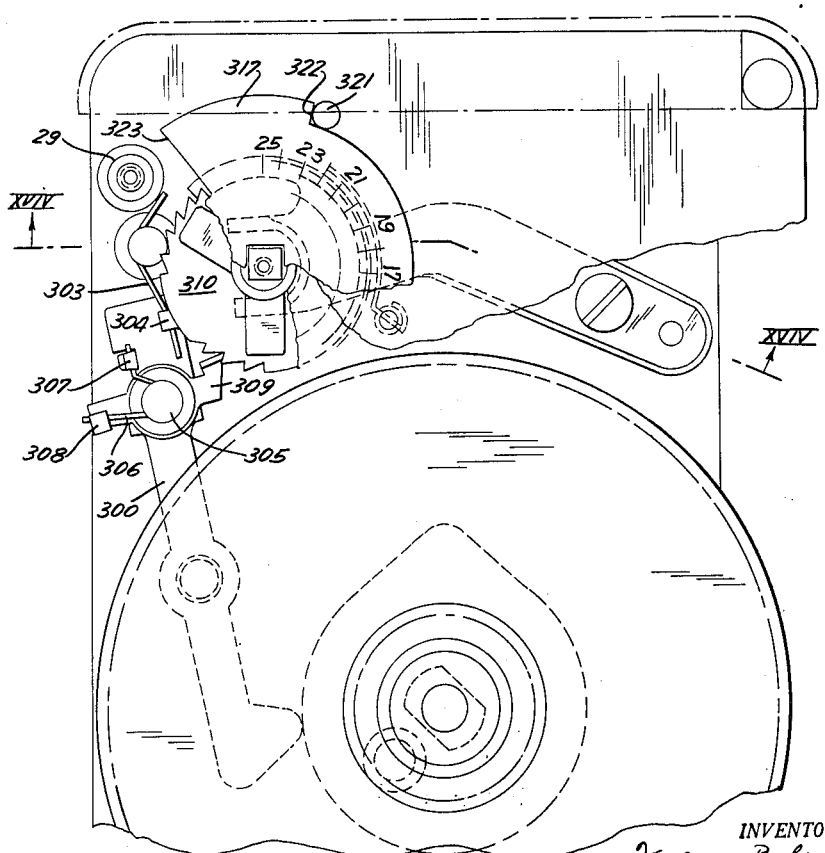
FIG. 18
INVENTOR.
Jacques Bolsey
BY Michael J. Striker
Atty Aug. 3, 1965            J. BOLSEY            3,199,117
COUNTER AND CONTROL STRUCTURES FOR MOTION PICTURE CAMERAS
Filed April 21, 1960            13 Sheets-Sheet 10

INVENTOR.
Jacques Bolsey
BY Michael S. Striker
Atty

Aug. 3, 1965  J. BOLSEY  3,199,117
COUNTER AND CONTROL STRUCTURES FOR MOTION PICTURE CAMERAS
Filed April 21, 1960  13 Sheets-Sheet 11
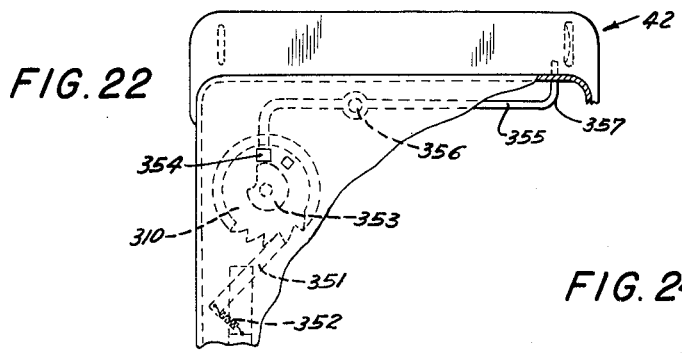
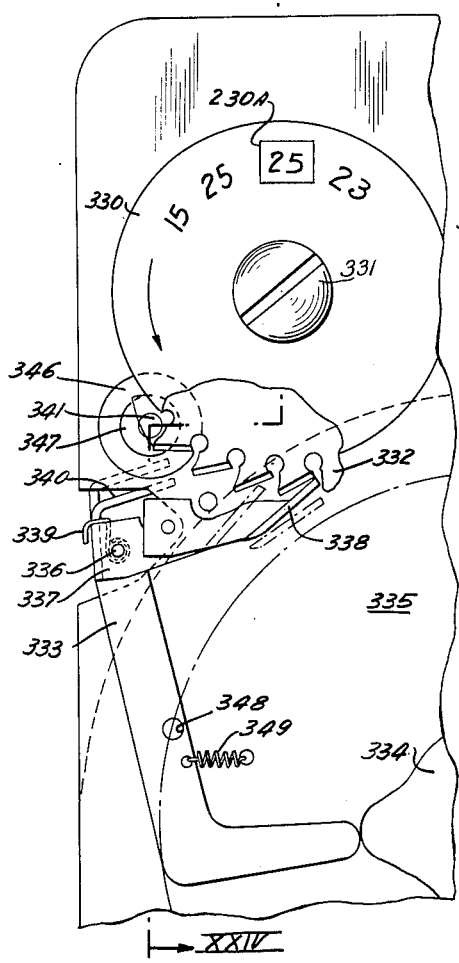
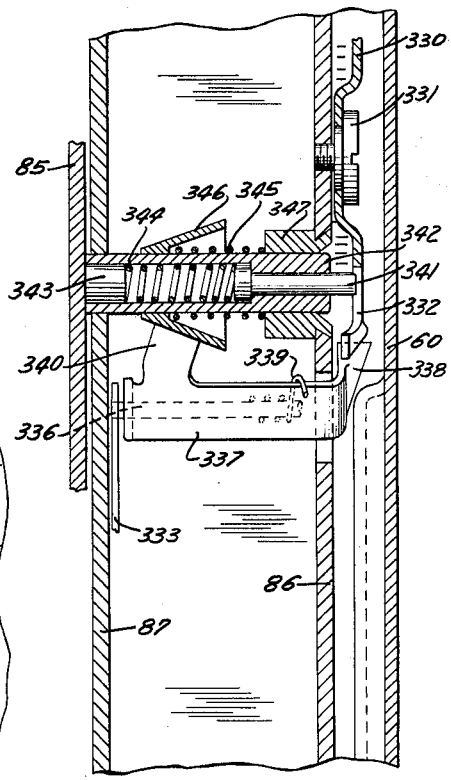
INVENTOR.
Jacques Bolsey
BY Michael S. Striker
Atty

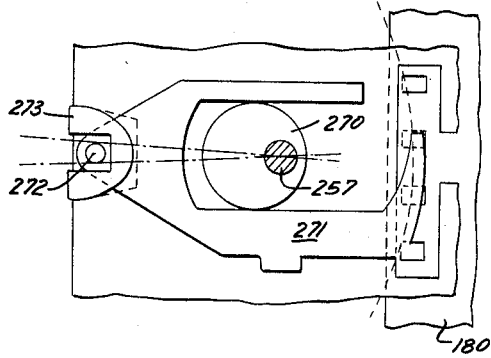
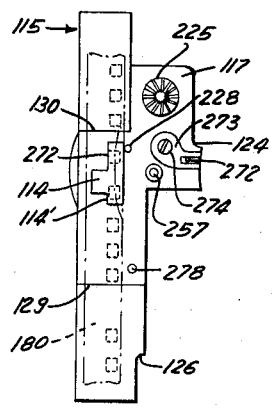
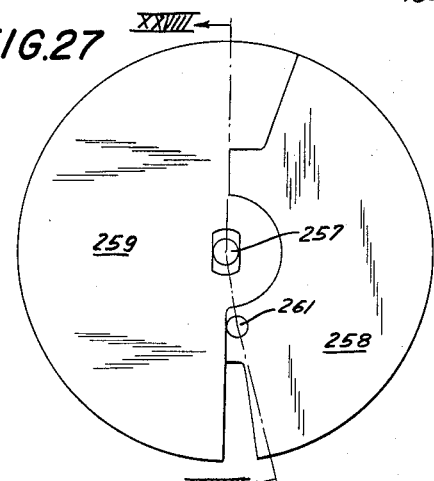
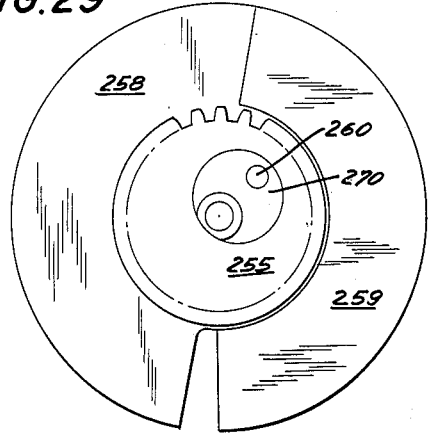
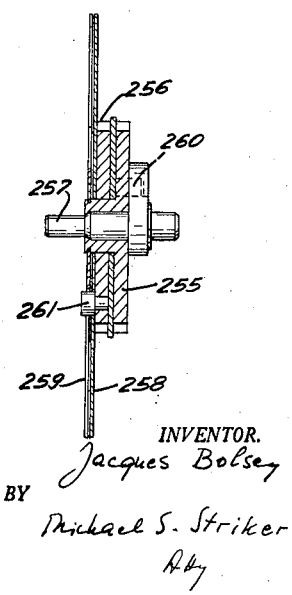

Aug. 3, 1965  J. BOLSEY  3,199,117
COUNTER AND CONTROL STRUCTURES FOR MOTION PICTURE CAMERAS
Filed April 21, 1960  13 Sheets-Sheet 13

INVENTOR.
Jacques Bolsey
BY Michael S. Striker
Atty

United States Patent Office 3,199,117
Patented Aug. 3, 1965

3,199,117
COUNTER AND CONTROL STRUCTURES FOR MOTION PICTURE CAMERAS
Jacques Bolsey, Hartsdale, N.Y., assignor, by mesne assignments, to Bolsey Corporation of America, New York, N.Y.
Filed Apr. 21, 1960, Ser. No. 23,853
8 Claims. (Cl. 352—172)

The present invention relates to cameras.

More particularly, the present invention relates to motion picture cameras.

It is an object of the present invention to provide an extremely small, simple motion picture camera with a relatively simple effective structure capable of indicating the film footage which remains to be exposed.

It is another object of the invention to provide a film footage indicator which will automatically zero itself whenever the magazine is moved from the camera, so that upon introduction of a new magazine into the camera the film footage indicator is automatically ready for operation.

An additional object of the invention is to provide a film footage indicator of the above type which will reliably become zeroed irrespective of the position of the actuating structure of the footage counter when the camera stops.

A further object of the invention is to provide a structure which will automatically set a footage counter of the above type up for operation when a magazine is introduced into the camera.

Still another object of the present invention is to provide a camera of the above type with a control structure which has a number of positions allowing several different types of operation to be carried out.

A still further object of the present invention is to provide a control structure which in one position is capable of blocking the camera against operation, which in another position is capable of operating the camera as long as an operating button is maintained depressed by the operator, which in still another position is capable of maintaining this button depressed so that the camera will continue to operate even if the operator does not hold the operating button depressed, and which in a still further position is capable of operating the motion picture camera as a still camera.

With the above objects in view the invention includes, in a motion picture camera, a casing which has a magazine compartment and a support means which supports a pin which extends into the magazine compartment when the latter is empty. Upon introduction of the magazine into the magazine compartment this pin is pushed outwardly of the compartment, and a structure cooperates with the latter pin for setting a footage counting structure into an operative position, so that in this way the footage counting structure is rendered operative in a fully automatic manner simply upon introduction of a magazine into the magazine compartment of the camera. The counter structure is actuated by a pawl and ratchet mechanism which is released from the counter disc itself when a magazine is removed from the camera so that a spring can zero the counter disc automatically, and a structure is provided for reliably placing the pawl out of engagement with the ratchet irrespective of the position of the pawl whenever the magazine is removed from the camera, so that zeroing is guaranteed at all times upon removal of a magazine from the camera.

The structure of the invention also includes a claw urged by a spring drive to oscillate for advancing the film and a stop lever which has an operating position in the path of movement of the claw so as to prevent oscillation of the latter and thus maintain the camera stopped against operation. An operating button is carried by the camera and when depressed acts on this stop lever to turn the latter to an inoperative position releasing the claw for operation, and this button can be turned to one position where it is blocked against movement so that the camera is blocked against operation at this time. In addition the button cooperates with a control lever which in one angular position of the button locates the control lever in the path of movement of the claw so that after the stop lever is turned away from the claw to release the latter for movement the claw will move and then be engaged by the control lever which will stop the claw from further movement as long as the button is depressed, and in this way the camera is capable of taking still pictures also.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is an exploded perspective illustration of the front wall assembly of the camera;

FIG. 6 is an exploded perspective illustration of the power-spring assembly;

FIG. 7 is an exploded perspective illustration of the magazine assembly;

FIG. 11 is a transverse section which is partly fragmentary and which is taken along line XI—XI of FIG. 8 in the direction of the arrows;

FIG. 12 is a fragmentary transverse section taken along line XII—XII of FIG. 9 in the direction of the arrows;

FIG. 13 is an elevation of another embodiment of a pressure plate which can be used in the magazine of the camera;

FIG. 15 is a diagrammatic illustration of another embodiment of a governor structure;

FIG. 16 is a diagrammatic illustration of a third embodiment of a governor structure according to the invention;

FIG. 17 is a section taken along line XVII—XVII of FIG. 16 in the direction of the arrows;

FIG. 18 is a fragmentary side elevation of a film-footage counter of the camera of the invention;

Figure 30:
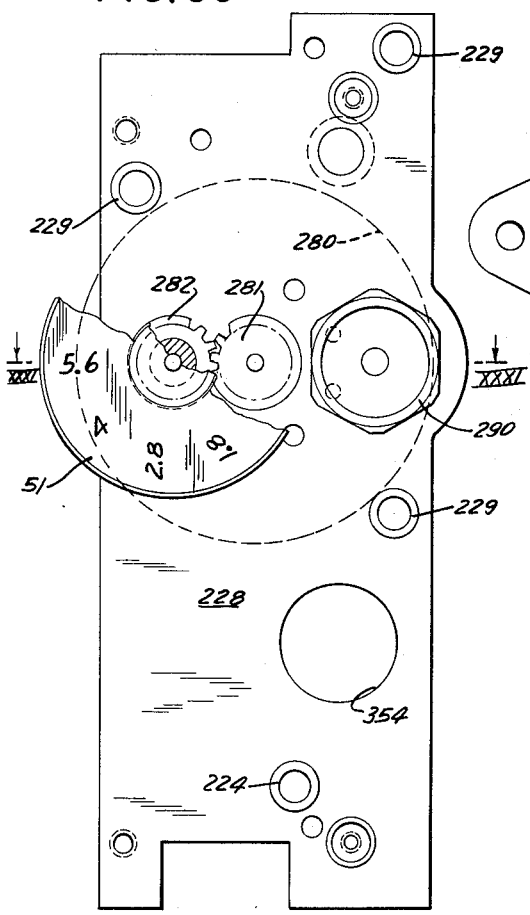
Figure 32:
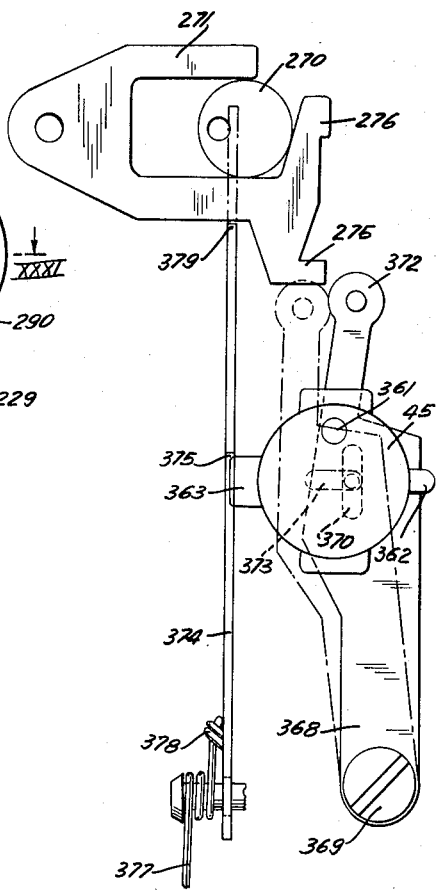
Figure 31:
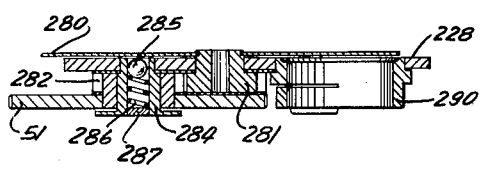

FIG. 22 diagrammatically illustrates another embodiment of a footage indicator of the invention;

FIG. 23 is a fragmentary side elevation of another embodiment of a film-footage counting structure of the invention;

FIG. 24 is a fragmentary transverse section taken along line XXIV—XXIV of FIG. 23 in the direction of the arrows;

FIG. 25 illustrates the claw assembly of the invention;

FIG. 26 is a fragmentary illustration of the manner in which the claw assembly acts on the film;

FIG. 27 is an elevation of the shutter assembly of the invention;

FIG. 28 is a transverse section taken along line XXVIII—XXVIII of FIG. 27 in the direction of the arrows;

FIG. 29 shows the structure of FIG. 28 as seen from the right of FIG. 28;

FIG. 30 is a front elevation of a plate of the front wall assembly, this plate carrying the structure which regulates the size of the exposure aperture as well as the nut which carries the objective;

FIG. 31 is a transverse section taken along line XXXI—XXXI of the FIG. 30 in the direction of the arrows; and FIG. 32 is a diagrammatic illustration of the control structure which enables the camera to be operated in a number of different ways.

*General*

Figure 2:
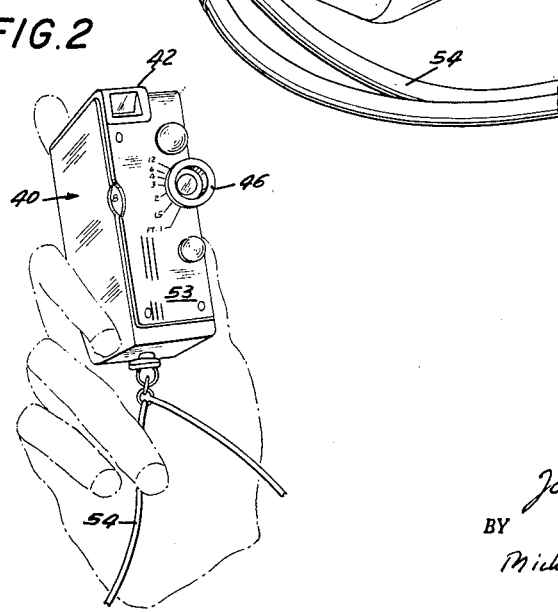
FIG. 2 is a view similar to FIG. 1 showing the camera held by the hand of the operator.

The motion picture camera of the present invention is exceedingly small and can comfortably be carried about in a pocket or in a lady's handbag, for example. Thus, the camera may be approximately 1″ from side to side, 3″ from top to bottom, and 2½″ from front to back. FIG. 2 illustrates the camera carried by the hand of the operator so as to give an approximate indication of the size of the camera.

Figure 1:
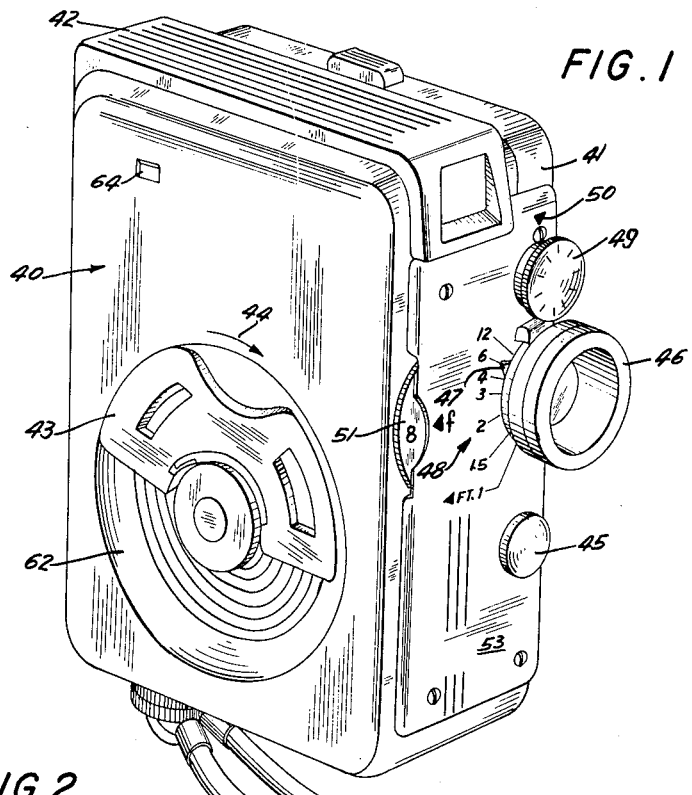
FIG. 1 is a perspective illustration of the camera of the invention as seen when looking toward the front of the camera and the side thereof which includes the spring-winding handle.

As may be seen from FIGS. 1 and 2, the camera include an exterior casing means 40, and this casing means includes a cover 41 which can be removed for the purpose of removing a magazine from a magazine compartment within the camera as well as for the purpose of introducing a new magazine. FIG. 1 shows the viewfinder 42 extending along the top of the camera as well as the handle 43 which is turned in the direction of the arrow 44 carried by the exterior casing 40 for the purpose of tensioning the power spring. When not in use the handle 43 lies against the side of the casing 40 in an exterior recess thereof, as clearly indicated in FIG. 1. FIG. 1 also shows at the front of the camera the operating button 45 which is turned to different angular positions and which is depressed for the purpose of operating the camera in different ways. Also, the objective 46 is shown at the front of the camera, this objective 46 carrying a projection 47 in the form of a pointer which cooperates with the indicia of a scale 48 for the purpose of focussing the camera.

In addition, there is located at the front of the camera a knob 49 which carries exposure time indicia and which can be turned to align this indicia with an index 50 for the purpose of regulating the exposure time of the camera.

The camera also includes a disc 51 shown in FIG. 1 projecting freely so that its rim is accessible for turning by the operator, and this disc 51 carries indicia indicating the size of the exposure aperture, this indicia being aligned with an index bearing the letter "*f*" so that the "*f*" or stop numbers are indicated in this way.

These items such as the operating button 45, the objective 46, the exposure time regulating knob 49, and the aperture regulating disc 51 all extend from a front plate 53 which carries indicia such as the scale 48 and which forms part of the front wall assembly described below.

A cord 54 in the form of a loop is removably connected to the camera at the bottom thereof, as indicated in FIGS. 1 and 2, so that the operator may insert his hand through this cord with the latter looped around the wrist, and in this way the camera can be securely held by the operator, as indicated in FIG. 2.

*Casing and framework*

Figure 3:
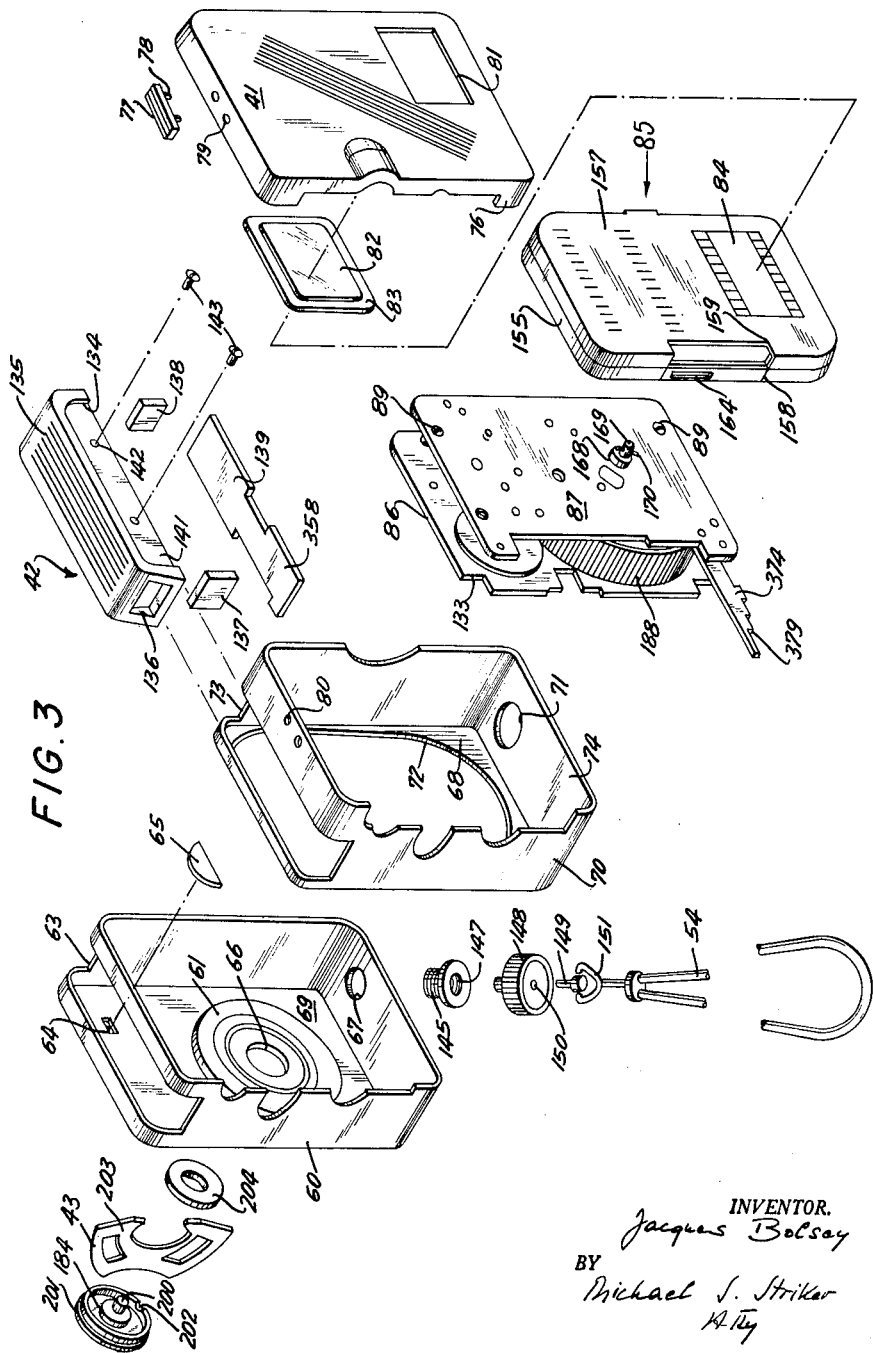
FIG. 3 is an exploded perspective illustration of the camera casing structure, the parts located at the exterior thereof, and a pair of mechanism-supporting plates as well as a magazine.

The casing means 40 includes, as shown most clearly in FIG. 3, an outer casing member 60 stamped from sheet metal such as stainless steel, for example, and this outer casing member 60 is in the form of a rectangular container with rounded corners and open at one side, as is evident from FIG. 3. It has an endless wall and a side wall, and this side wall is visible in FIG. 1 and is formed with a circular indentation 61 so as to provide the circular recess 62 shown in FIG. 1 to accommodate the handle 43 of the power spring. At its top wall the outer casing member 60 is formed with an elongated cutout 63 of substantially rectangular configuration. The side wall of the casing 60 is formed adjacent its upper rear end with a window 64, and an element 65 of clear plastic, for example, is fixed to the inner surface of the side wall of the casing 60 and covers the window 64 so that foreign matter cannot enter through this window. As is evident from FIG. 1 at the exterior surface of the casing member 60 is a window 64, and in this window appears an indication of the number of feet of film left to be exposed. The circular indentation 61 is formed with a central opening 66 for a purpose described below, and the bottom wall of the casing 60 is formed with an opening 67 for a purpose described below.

The casing means 40 further includes an inner casing member 70 (FIG. 3) which nests within the outer casing member 60 with a fairly snug fit. Although this fit is fairly snug the casing member 70 can be slipped without difficulty into and out of the casing member 60. The casing member 70 is of the same general configuration as the casing member 60 and has a bottom wall formed with an opening 71 which is coaxial with and located over the opening 67 of the casing member 60. When the casing member 70 is nested within the casing member 60 the side wall 68 of the casing member 70 is located directly next to the side wall 69 of the casing member 60, and this side wall 68 is formed with a relatively large cutout 72 through which the circular indentation 61 extends, and also the window 64 is accessible through the cutout 72. In addition, the casing member 70 is formed in its top wall and at the upper portions of its front and rear walls with an elongated cutout 73 of the same size as the cutout 63 and aligned with the latter. The endless side wall of the casing member 70 has a width greater than the width of the endless side wall of the casing member 60 so that the casing member 70 has a peripheral edge portion 74 which extends beyond the free edge of the endless side wall of the casing member 60 when the member 70 is nested within the casing member 60.

The cover 41 is also of a generally rectangular configuration and includes an endless flange 76 which fits snugly over the free edge portion 74 of the casing member 70 so that when the cover 41 is in its position closing the camera the free edge of the flange 76 will abut against the free edge of the casing member 60. A member 77 is fixed to the top wall of the cover 41 and has a pair of projections 78 extending downwardly through a pair of openings 79 formed in the top wall of the cover 41, and these projections 78 snap into a pair of recesses 80, respectively, formed in the top wall of the casing member 70 along the free edge portion 74 thereof. Due to the springiness of the metal of the casing member 70 the projections 78 will snap into the recesses 80, and in this way the cover 41 will be releasably held on the casing member 70 in a light-tight manner, but at the same time the cover 41 can be easily removed by the operator.

This cover 41 is formed in its side wall with a window 81 which is covered by a member 82 of clear transparent plastic which is fixed to the inner surface of the cover 41 extending across the window 81 thereof. The window 82 is surrounded by an endless portion 83 of foam rubber or the like, and when the magazine 85 is in the camera the endless member 83 presses against the exterior surface of the magazine 85 so as to maintain light-tightness around the window 81. Thus, indicia 84 pertaining to the nature of the film within the magazine 85 is visible through the window 81 while at the same time light cannot pass from this window 81 into the interior of the camera to undesirably expose the film. Of course, it is not essential to provide light-tightness around the window 81 by means of an endless strip 83 of foam rubber or the like. A single straight strip of foam rubber may be glued to the inner surface of the cover 41 extending diagonally across the same from its upper right corner to its lower left corner, as viewed in FIG. 3, and of course such a simple straight strip will also provide the desired light-tightness.

The above-described casing means houses a framework which carries the mechanism of the camera, and this framework includes a pair of parallel plates 86 and 87 (FIGS. 3 and 4) made of any suitable rigid metal. A spacer means is located between the mechanism-carrying plates 86 and 87 to connect the latter to each other while maintaining them parallel to each other at a given distance from each other, and this spacer means includes a lower block 88 of metal located between and engaging the plates 86 and 87. A screw 89 extends through an opening 90 of the plate 87 into a threaded bore 91 of the block 88, and a similar screw extends through the opening 98 of the plate 86 into a threaded bore of the block 88, so that in this way the latter block is fixed to the plates 86 and 87, and in addition this block 88 may be soldered to the plates 86 and 87 so that the block 88 cannot move with respect to the plates 86 and 87 once it is fixed thereto.

The spacer means further includes a pair of spacer pins 92 and 93 (FIG. 4), the pin 92 having reduced ends one of which extends into an opening 94 of the plate 86 to be fixed to the latter by any suitable screw or the like. In a similar manner the spacer pin 93 has a reduced end extending into the opening 95 of the plate 86 and fixed to the latter. The opposite reduced ends of the spacer pins 92 and 93 respectively extend into openings 96 and 97 of the plate 87 and can be upset in these openings 96 and 97 so as to have a riveted connection to the plate 87.

An additional pair of spacer members 100 and 101 are fixedly carried by the plate 87 between the latter and the plate 86. The spacer member 101 has a reduced end received by the opening 102 of the plate 87 and upset in this opening so as to be fixed to the plate 87, and in the same way the spacer member 101 has a reduced end received in the opening 103 and riveted to the plate 87 in the opening 103. The spacer members 100 and 101 also have reduced ends directed away from the plate 87, and these latter reduced ends respectively extend through the openngs 104 and 105 of a bridge plate 106 which is connected by the spacer members 100 and 101 to the plate 87 in spaced parallel relation to the latter. The member 101 has a riveted connection to the bridge 106 in the opening 104 of the latter, while the member 100 has an elonged threaded portion 107 receiving a nut 108 which serves to participate in the fixing of the bridge 106 to the spacer member 100. Elongated member 109 has a threaded bore which receives the elongated threaded portion 107 of the spacer member 100, and the free end of this member 109 bears against the inner surface of the plate 86. This free end of the member 109 is also formed with a threaded bore, and a screw 110 extends through the opening 111 of the plate 86 into threaded engagement with this threaded bore of the member 109, so that in this way the member 109 together with the member 100 form an adjustable spacer located between the plates 86 and 87.

The framework of the camera includes in addition to the mechanism-carrying plates 86 and 87 and the above-described spacer means interconnecting these plates, a frame member 115 of the front wall assembly of the camera, this frame member 115 being shown in FIGS. 5 and 26. The frame member 115 has, as viewed in FIG. 5, an elongated portion 116 on the right thereof, while a shorter portion 117 projects to the left from the elongated portion 116. The frame member 115 is made of any suitable metal and may be suitably coated with a black coating. When the frame member 115 is assembled with the plates 86 and 87, the elongated portion 116 of the frame member 115 extends along the exterior right surface of the plate 87, as viewed in FIG. 4, and only the relatively short portion 117 of the frame member 115 extends across the space between the plates 86 and 87. A screw member 118 extends through an opening 119 into pivot engagement with a threaded bore 120 of the frame member 115, while a similar screw member 121 extends through an opening 122 of the plate 87 into threaded engagement with the threaded bore 123 of the frame member 115, so that this latter frame member is fixed in this way to the plate 87 with the front portion of this plate engaging the left surface of the elongated portion 116 of frame member 115, as viewed in FIG. 5. The projection 117 is provided at its lower left end portion, as viewed in FIG. 5, with a projecting portion 124 which is received in the notch 125 of the plate 86 (FIG. 4).

As is evident from FIGS. 5 and 26, the frame member 115 has a shoulder 126, and this shoulder 126 engages the edge 127 of the plate 87. The shoulder 128 of the plate 87 is engaged by the top surface of the projecting portion 117 of the frame member 115.

The frame member 115 is provided at its rear surface with a shoulder 129 extending across the elongated portion 116 of the frame member 115, and a similar shoulder 130 extends part way across the member 115 at an elevation higher than the shoulder 129. The shoulder 129 engages the shoulder 131 of the plate 87, while the shoulder 130 simply forms the upper limit of the film gate formed by the frame member 115. For this purpose the frame member 115 is formed with the film gate opening 114 through which the film is exposed. The shoulders 129 and 130 of the frame member 115 are shown in relation to the film in FIG. 10.

Figure 4:
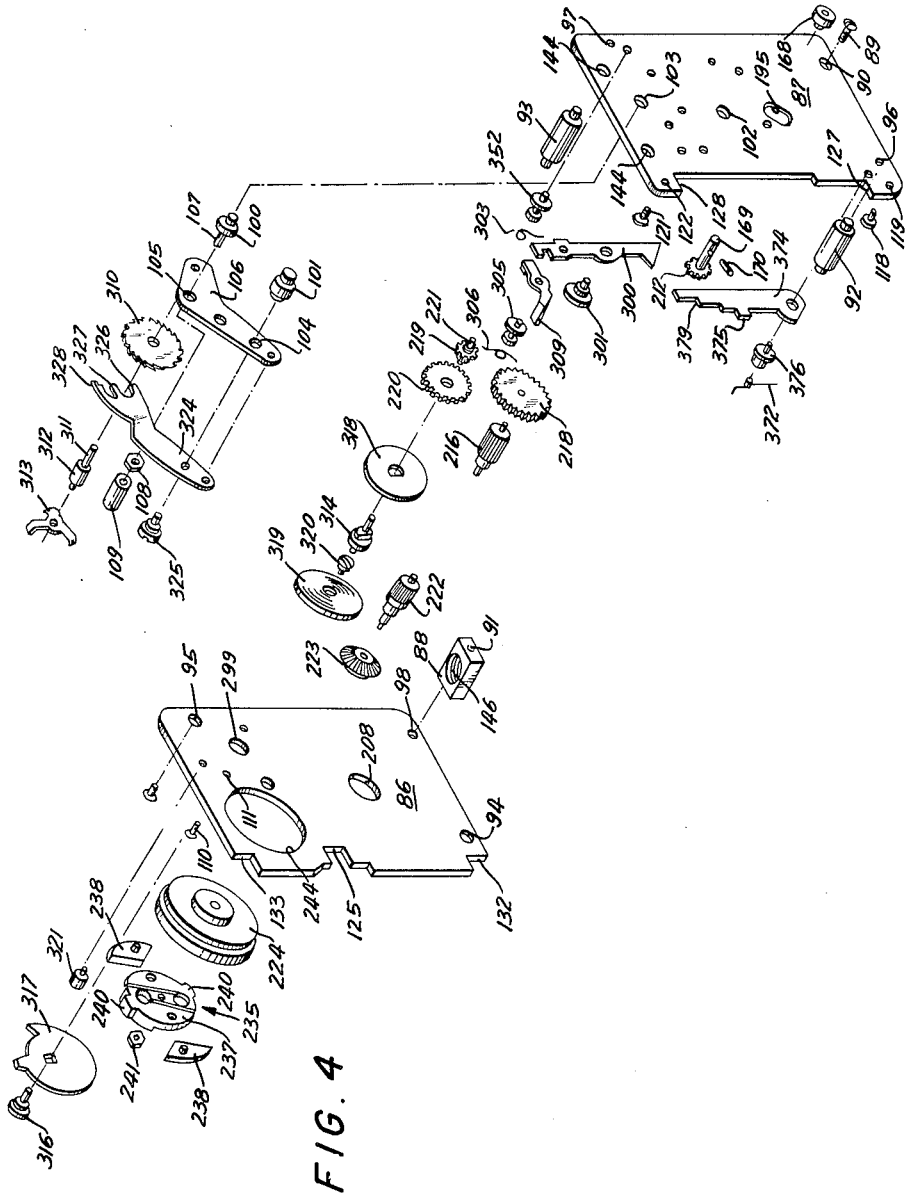
FIG. 4 is an exploded perspective illustration of the pair of mechanism-carrying plates and all of the structure carried thereby, with the exception of the power-spring assembly.

It will be noted from FIG. 4 that the upper and lower front corners of the plate 86 are formed with the notches 132 and 133, and these notches are provided so that a screwdriver will have easy access to the screws 118 and 121 for fixing the member 115 to the plate 87.

The viewfinder 42 includes an elongated viewfinder housing 135 (FIG. 3) made of any suitable metal such as stainless steel, for example, and the elongated housing 135 is formed at its front end with a window 136 which is closed by the viewfinder objective 137 fixed to the interior of the housing 135 and extending across and closing the window 136. In the same way the rear wall of the viewfinder housing 135 is formed with an ocular opening which is closed by the ocular 138 fixed to the interior of the viewfinder housing 135 extending across this rear opening thereof. A plate 139 closes the bottom of the viewfinder housing and is fixed to the viewfinder housing 135 in any suitable way.

The side walls of the viewfinder housing 135 are extended so that this housing is provided with a pair of side wall portions 141 from which lips 134 extend. The right side wall 141 which is visible in FIG. 3 is formed with a pair of openings 142. After the interconnected plates 86 and 87 are slipped into casing member 70, the viewfinder housing 35 with all of the viewfinder structure carried thereby is introduced into the aligned cutouts 63 and 73, and the surface of the outer casing member 60 which surrounds the cutout 63 thereof bears against the lips 134. The side walls 141 slide snugly between and engage the plates 86 and 87, so that in this way the viewfinder 42 serves to connect the mechanism-carrying plates 86 and 87 very precisely to the casing means 40 in the interior of the latter. With the viewfinder housing 135 thus assembled, suitable screw members 143 are placed through the opening 144, respectively, of the plate 87 into threaded engagement with the openings 142, so that in this way the viewfinder is fixed to the plate 87.

A tripod screw member 145 extends through the aligned openings 67 and 71 into threaded engagement with the threaded bore 146 of the block 88, so that in this way this tripod screw 145 also participates in this fixing of the plates 86 and 87 to the casing means 40 in the interior of the latter. The tripod screw 145 is formed with a threaded bore 147 adapted to receive the top end of a tripod, or, in the case of FIG. 3, a screw member 48 formed with a central bore 150 to which a pin 149 is fixed and several chain links 151 are connected with the cord 54, and the uppermost chain link of FIG. 3 as pivotally connected with the head end of the pin 149, so that in this way the cord 54 is connected to the tripod screw 145. The screw 148 can be quickly removed from the threaded bore 147 so that the camera can then be mounted on a tripod.

Figure 10:
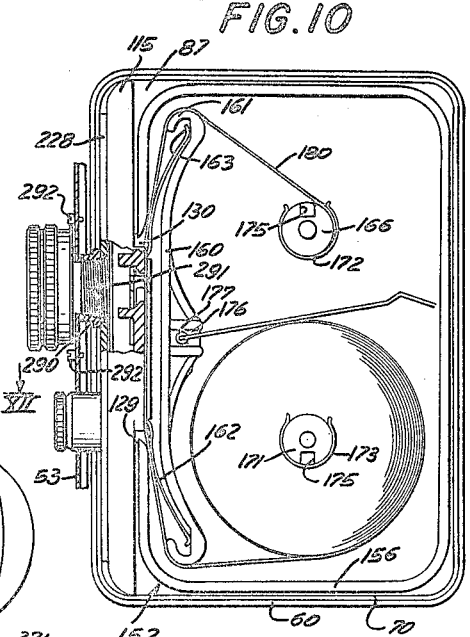
FIG. 10 is a side elevation of the camera with the casing cover removed as well as with the magazine cover removed so as to show the inside of the magazine, FIG. 10 also showing the objective assembly and part of the front wall assembly in section.

As is evident from FIG. 10, the frame member 115 at its portion which extends toward the observer of FIG. 10 beyond the plate 87 together with this plate 87 and the portion of the inner casing member 70 which surrounds the plate 87 forms a magazine compartment 52 which is adapted to receive the magazine 85.

*Magazine assembly*

The magazine assembly of the invention is shown most clearly in FIGS. 7 and 10.

Referring to FIG. 7, it will be seen that the magazine assembly includes a rectangular container member 155 which is open at one side and which is provided with a peripheral portion 156 of reduced thickness, this peripheral portion 156 being overlapped by the cover 157 which carries at its exterior the indicia 84 referred to above. Of course, the edge of the cover 157 cooperates in a light-tight manner with the edge portion 156 of the member 155. At its front wall the member 155 is formed with an elongated cutout 158, and a cover 157 has an elongated cutout 159 of the same length as and aligned with the cutout 158. Behind the cutout 158, 159 the member 155 carries a wall 160 provided with curved ends 161, and a pressure plate 162 made of springy sheet metal has its free curved ends 163 located within the curved ends 161 of the member 160. The springiness of the pressure plate 162 is such that when the magazine is out of the camera the pressure plate will engage the edges of the front wall of member 155 located at the ends of the cutout 158, and film in the camera will be pinched between these edges and the pressure plate so that no light can enter into the magazine through the cutout 158 when the magazine is out of the camera. The pressure plate 162 is formed with an elongated notch 164 made of a sufficient length and width to provide no hindrance to the movement of the tooth of the film-advancing claw referred to below, this tooth extending through a perforation of the film into the slot 164 during operation of the camera.

The member 155 fixedly carried a pin 165 which extends into an axial bore of a core member 166 of a supply spool located within the magazine. Also the member 155 is formed in its side wall with a bore surrounded by a ring 167. Referring now to FIG. 11, the bushing 168 which is fixedly carried by the plate 87 extends into the ring 167 through the opening in the side wall of the member 155 when the magazine is placed within the compartment 152 of the camera, and a driving pin 169 which is rotated in a manner described below carries a cross pin 170 and extends into a bore of the core member 171 of the take-up spool of the camera, this bore having a pair of axial slots or keyways receiving the free ends of the cross pin 170, so that in this way rotary movement of the driving pin 169 of FIG. 11 will be transmitted to the core 171 of the take-up spool to rotate the latter and wind film onto the take-up spool. A spring clip 172 resiliently engages and extends partly around the core 166, while a similar clip 173 resiliently engages and extends partly around the core 171, and these clips serve to connect the ends of the film to the cores.

A pair of springy circular members 174, one of which is shown in FIG. 7, are fixed to the inner surface of the cover 157, and these circular members 174 are formed with radial slits and have a portion at one side of this slit bent away from the cover member 157 so as to form a springy tooth. These members 174 are aligned with the free ends of the cores 166 and 171, respectively, and these cores are formed with notches 175 into which the bent portions of the springy members 174 snap during rotation of the cores. Thus, these springy free end portions of members 174 act as springy teeth cooperating with the notches 175 of the cores to limit these cores to one direction of rotation. The spring pressure of the clips 172 and 173 is carefully chosen so that when tension above a given value is applied to the film 180 (FIG. 10) this film will no longer be held between the spring clip and the core and will instead slip out of the grip to be released from the core. Thus, in the event that the core 171 of FIG. 10 should be turned in a counter clockwise direction, as viewed in FIG. 10, beyond the point shown in FIG. 10, the end of the film 180 will simply be pulled away from the clip 172 and the core 166 shown in FIG. 10.

As may be seen from FIG. 10, the member 155 has a portion 176 formed with a recess 177, and this recess 177 receives the projection 178 at the end of an arm 179 which is freely turnable within the magazine between the supply and take-up spools, so that in this way the turns of one spool will not engage the turns of the other spool.

When the magazine is introduced into the compartment 152, after the casing cover 141 has been removed, there is sufficient clearance in this compartment for the operator to press the film and the pressure plate against the film guiding surface at the rear of the frame member 115 extending between the shoulders 129 and 30, so that this portion of the frame member 15 presses the film against the pressure plate 162 and shifts the latter inwardly away from the front wall of the magazine to the position shown in FIG. 10, so that in this way the film is very precisely pressed against the film gate by the pressure plate so that the film can slide along the film gate while being precisely located at the proper distance from the objective in the foco plane.

*Power spring assembly*

The power spring assembly of the camera of the invention is shown most clearly in FIGS. 6 and 11. This assembly includes the spiral power spring 185 whose inner end surrounds an inner hollow core member 186 which has a projection 187 extending through an opening at the inner end of the spring 185 and riveted to the latter so that in this way the inner end of the spring is fixed to the hollow core 186. The spring 185 is housed within a barrel 188, and the outer end of the spiral spring 185 is formed with an opening 189 to which a lug on the inside of the barrel 188 is fixed, so that in this way the outer end of the spiral spring 185 is fixed to the circular rim of the barrel 188. The barrel is closed by a circular plate 190 which retains the spring 185 within the barrel 188, this plate 190 having a plurality of peripheral projections 191 extending into notches 192 formed in the free edge of the circular wall of the barrel 188, as shown most clearly in FIG. 8.

A stationary pin 193 is located coaxially within and is faced from the hollow core 186. This pin 193 has a reduced end portion 194 extending into the opening 195 of the plate 87 (FIG. 4), and this reduced end portion 194 is upset so that the stationary pin 193 is riveted to the plate 87 to be fixed to the latter in this way. It will be noted that the opening 195 as well as the reduced end portion 194 of the pin 193 are of non-circular cross-section, so that the stationary pin 193 is prevented from turning around its own axis.

Figure 8:
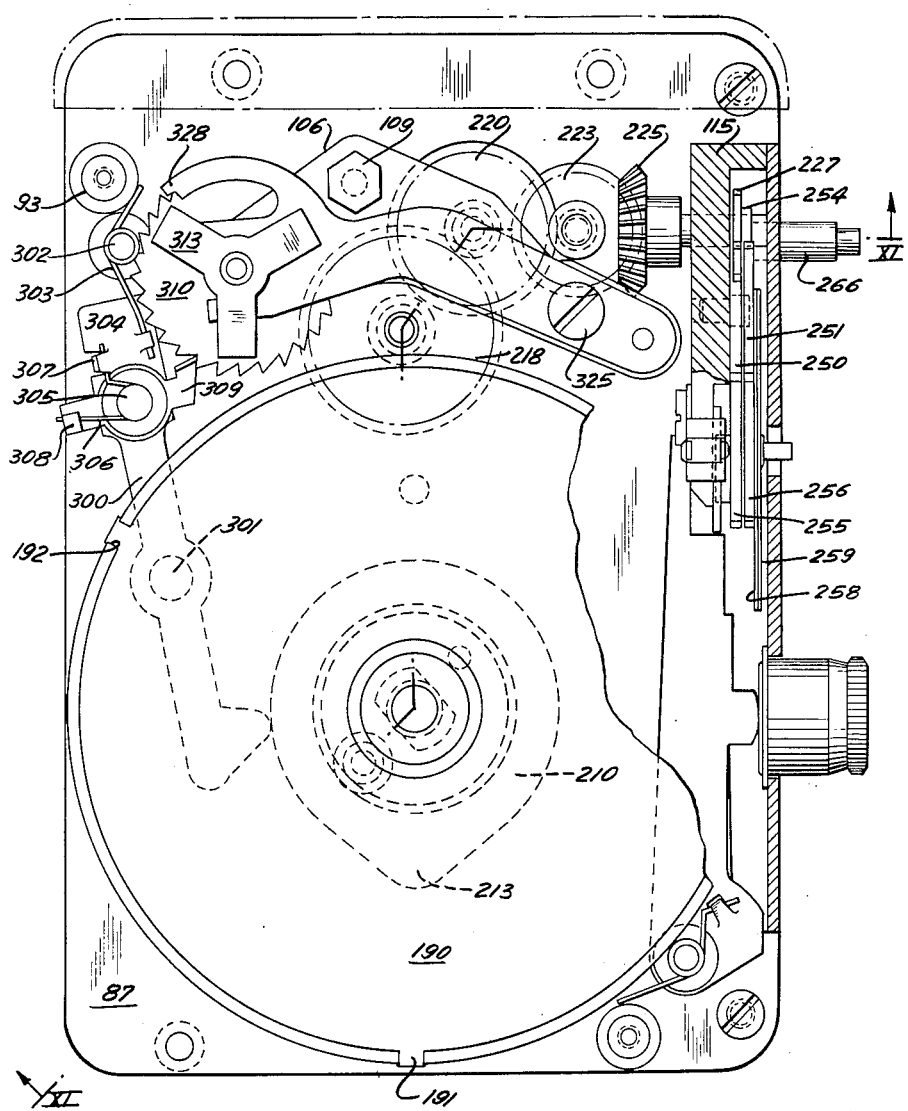
FIG. 8 is a side elevation of one of the mechanism-carrying plates and part of the structure carried thereby, FIG. 8 also showing in section part of the front wall assembly.

A coil spring 196 surrounds the pin 193 and is located between the latter and the rotary inner hollow core member 186 of the power spring assembly, and one free end of coil spring 196 is radially bent as indicated at 197, and this free end 197 is located in one of the notches 198 formed at one end of the hollow core member 186, so that when this core member is turned in a clockwise direction, as viewed in FIGS. 6 and 8, it will have a tendency to tighten the coils of the spring 196 on to the stationary pin 193, and due to this gripping of the stationary pin 193 by coils 196 when the core 186 tends to turn in a clockwise direction, as viewed as FIGS. 6 and 8, the core 186 is prevented from turning in this direction, and thus the operator cannot turn the core 186 in a clockwise direction, as viewed in FIGS. 6 and 8. When the operator turns the core 186 to the opposite direction, the tendency is to enlarge the coils of the spring 196 so that they now turn freely with respect to the stationary pin 193 and thus the stationary pin 193 together with the spring 196 form a means which limits the turning of the core 186 to one direction of rotation. In this way asuming that the barrel is maintained stationary, it is possible to tension the spring 196 which cannot turn the core 186 with respect to the stationary pin 193.

Figure 14:
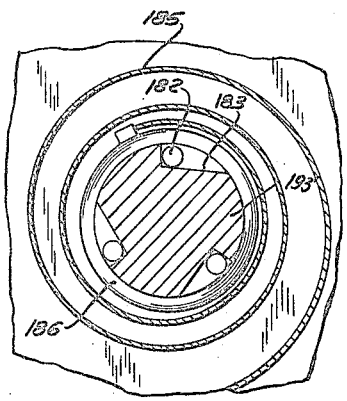
FIG. 14 is a fargmentary transverse section illustrating another embodiment of a structure for limiting the power-spring to one direction of rotation.

FIG. 14 illustrates another embodiment of a means for limiting the inner hollow core 186 to one direction of rotation. In FIG. 14, the stationary pin 193', which corresponds to the stationary pin 193, is formed with axial grooves 183 of non-symmetrical V-shaped cross-section, as illustrated in FIG. 14, and the rollers 182 are respectively received in these grooves 183 and are engaged by the inner surface of the hollow core 186. Thus, as may be seen from FIG. 14, as long as the core 186 turns in a counter clockwise direction, as viewed in FIG. 14, it can turn freely, while when the core 186 turns in a clockwise direction, as viewed in FIG. 14, the rollers 182 will become wedged in the grooves 183 and will thus prevent turning of the core 186 in a clockwise direction, so that with the structure of FIG. 14 it is also possible to maintain the spring 185 tensioned.

It should be noted in connection with both embodiments of the means for limiting the inner hollow core of the power spring assembly to one direction of rotation, that both of these means are located within the hollow core of the power spring assembly, so that an extremely small space is required by this structure and this arrangement is one of the factors contributing to the extreme compactness and small size of the camera of the invention. Moreover, by locating the entire means for limiting the core to one direction of rotation within the hollow core itself it is not possible for this means to come in contact with other structure and it is protected from other structure so that a long life of faultless operation is assured.

The rotary hollow core 186 extends through a central opening of the plate 190 which closes the spring barrel 188, and the core 186 also extends freely through an opening 208 formed in the plate 86. Of course, the power spring assembly is located between the plates 86 and 87, as indicated in FIG. 11. The projecting portion 205 of the core 186 extends beyond the plate 86 and is accessible at the opening 66 of the outer cover member 60, this projection 205 extending across the opening 72 of the inner casing member 70.

The free end portion 205 of the core 186 is formed with an axial threaded bore 199, and the threaded portion 200 of a screw member shown at the left of FIG. 3 is received in the threaded bore 199. The direction of the threading of the screw 200 and the bore 199 is such that the screw 200 becomes tightened in the bore 199 to the core 186 when the screw 200 is turned in that direction which tensions the spring 185. The screw 200 has an enlarged portion 184 which is fixed to a hollow cap member 201 which has a flange formed with a pair of opposed notches 202, and the winding handle 43 has a pair of teeth 203 which are respectively received in the notches 202 extending respectively through these notches into the hollow cap 201 which is fixed to the enlarged portion 184 of the screw 200. A circular springy plate 204 surrounds the screw 200 and the portion 184 thereof, and the free end of the portion 184 which is visible in FIG. 3 is upset after the spring 204 is placed around this portion 184, so that the end of the enlarged portion 184 which is visible in FIG. 3 overlaps the inner periphery of the circular springy plate 204 and thus retains the latter assembled with the hollow cap 201. Before the springy ring 204 is joined in this way to the screw member 200, the teeth 203 of the handle 43 are placed in the notches 202 and thus the spring 204 serves to connect the handle 43 to the cap member 204 so that the handle 43 cannot now be removed. As a result of the springy ring 204, the handle will be resiliently held in the recess 62 flat against the indented portion 61 when the handle is not in use, but at the same time the operator can in opposition to the resilient force of the spring 204 turn the handle 43 outwardly so that it extends perpendicularly from the side wall of the outer casing member 60 and now the handle can be turned for the purpose of tensioning the spring 185.

Of course, the screw 200 and the structure connected thereto is not assembled with the core 186 until after the mechanism-carrying plates 86 and 87 and the structure carried thereby is mounted within the camera casing means 40 in the manner described above, and also the screw 200 and the structure carried thereby is removed simply by unscrewing the same from the core 186 when it is desired to remove the plates 86 and 87 and the structure carried thereby from the interior of the camera casing means 40.

The stationary central pin 193 extends through a central opening 207 which is formed in the side wall of the barrel 188.

*Gear train*

The above-described power spring assembly is used to drive the various components of the camera through a gear train. As was pointed out above in connection with the magazine assembly, the pin 169 shown in FIG. 11 is used to drive the take-up spool of the magazine. The drive from the power spring to the drive pin 169 of the magazine takes place through an inner ring gear 210 (FIGS. 6 and 11) which is fixed by screws 211 to the exterior surface of the side wall of the barrel 188 coaxially with the latter. This inner ring gear 210 meshes with a gear 212 which is fixed to the free end of the drive pin 169 between the plate 87 and the barrel 188 within the space surrounded by the ring gear 210. Thus, during rotation of the barrel 188 the drive pin 169 will be rotated.

The transmission ratio between the gears 210 and 212 is such that with a speed which is controlled by the governor assembly described below the pin 169 will rotate at a predetermined speed which will rotate the core 171 of the take-up spool at an angular speed which is of a predetermined value. Thus, considering the take-up spool from the moment the film starts to be wound thereon until the end of the take-up spool is wound thereon, it will be appreciated that due to the increasing diameter of the take-up spool during the winding of the exposed film thereon this film will be wound on the take-up spool without any slack and without any undesirable tension if the speed of rotation of the drive pin 169 and thus of the core 171 decreases continuously from a given starting value so that as a result the film will be delivered to the take-up spool with a given predetermined changing linear speed equal to the rate at which the film is fed to the take-up spool by the film-advancing claw described below. Since it is not feasible to provide a structure which will continuously decrease the speed of rotation of the take-up spool in this manner, it is conventional to provide a drive which will operate on the take-up spool through a friction clutch assembly, but with the camera of the invention such a friction clutch is not used. Instead, the speed of rotation of the drive pin 169 is equal to onehalf the maximum and minimum speeds of rotation which would be required in a case where the speed of the takeup spool were continuously diminished so as to take up the film exactly at a given unchanging linear speed equal to the speed with which the speed is delivered to the takeup spool by the film-advancing claw. By providing a speed of rotation of the driving pin 169 and the core 171 which is midway between these maximum and minimum speeds, the initial speed of rotation will be less than the ideal speed of rotation so that during the first half of the winding of the exposed film on to the take-up spool the convolutions of the take-up spool will be rather loose. However, during the second half of the rotation of the take-up spool the speed of rotation of the drive pin and the core 171 will be greater than the ideal constantly diminishing values of this speed of rotation, so that during this second half of the rotation of the driving pin 169 and core 171 the looseness in the convolutions will be taken up and all of the convolutions will snugly engage each other precisely at the end of the rotation of the take-up spool when the entire film strip is wound thereon, and in this way it is possible to avoid the use of any friction clutches while at the same time winding the film in the best possible manner on to the take-up spool.

The ring gear 210 has a smoothly curved projecting portion 213 at one side, and this projecting portion 213, shown in FIGS. 6 and 8, forms a cam for a purpose described below.

The exterior periphery of the barrel 188 is formed with gear teeth 214, and as may be seen from FIG. 11, this barrel meshes with the teeth 216 which are formed on a shaft 215 which extends between the plates 86 and 87. These plates are formed with bores which receives the reduced ends 217 of the shaft 215 so as to form a bearing for the shaft 215 which is thus supported for rotation around its axis. The gear 216 is fixed coaxially with a gear 218 which is located next to the plate 87 (see also FIG. 4), and this gear 218 meshes with a pinion 219 which is fixed coaxially to a gear 220, both the pinion 219 and the gear 220 being fixedly carried by a shaft 221 which has reduced end portions respectively located in coaxial openings of the plate 87 and bridge 106, so that in this way the gears 219 and 220 are supported for rotation together about their common axis. Of course, the gear 218 extends into the space between the bridge 106 and plate 87, and the gears 219 and 220 are located in this space between the bridge 106 and the plate 87.

The gear 220 meshes with a gear 222 one end of which is reduced and is supported in a suitable opening of the plate 87 for rotation. The other reduced end portion of the gear 222 extends through a central opening of a cup 24 which forms part of the governor assembly described below and which is fixedly carried by the other plate 86, so that in this way the cup 224 serves also to support the gear 222 for rotation about its axis, and of course the drive to the governor assembly takes place through this shaft 222.

The shaft 222 is fixed coaxially with a bevel gear 223 which meshes with a second bevel gear 225 shown in FIGS. 5 and 11, and this bevel gear 225 is fixed to a shaft 226 which extends through an opening of the frame member 115 and is turnably supported in this opening. On the side of the frame member 115 opposite from the bevel gear 225 the shaft 226 fixedly carries a gear 227.

The front wall unit or assembly of the camera of the invention includes a plate 228 which is fixed directly to the front face of the frame member 115 so as to define with this frame member various chambers formed by recesses in the front face of the frame member 115 and the rear face of the plate 228. Thus, this plate 228 is formed with a series of openings 229, and a series of screws 230 respectively extend through the openings 229 into threaded engagement with threaded bores 231 which are formed in the front face of the frame member 115, so that in this way the plate 228 is fixed to the front face of the frame member 115. This plate 228 is formed with an opening which receives the reduced front end of the shaft 226, as is evident particularly from FIG. 11, and in this way the plate 228 serves also to support the shaft 226 for rotation about its axis. From the gear 227 the drive is transmitted in a manner described below to the shutter and claw assemblies of the camera.

*Governor assembly*

As was pointed out above, the gear 222 has a reduced end portion supported for rotation by a central opening of a cup 224 which forms part of a governor assembly of the invention. This cup 224 may be made of brass or the like, and it is fixed in the opening 244 (FIG. 4) of the plate 86 in the manner as shown most clearly in FIG. 11. The governor includes a rotary member 235 made of a plastic such as nylon, for example, and as is shown most clearly in FIG. 21, this rotary plastic circular plate 235 is formed with a pair of opposed substantially keyhole slots 236 so that in this way the plate 235 is provided with a pair of diametrically opposed springy winged portions 237 which are adapted to fly outwardly away from the axis of the gear 222 during rotation of the latter. The free end of the gear or shaft 22 is threaded and extends through a central opening of the pastic governor member 235, and a nut 241 is threaded on to the free threaded end portion of the gear 222 so as to fix the governor member 235 to the gear 222 for rotation therewith. A pair of weights 238 are fixed by rivets 239, respectively, to the wings 237, respectively, of the governor member 235 (see also FIG. 4), and the governor member 235 has a pair of diametrically opposed projections 240 which are located next to the inner surface of the cup 224. Thus, during rotation of the governor member 235 when the weighted wings 237 tend to move centrifugally away from the axis of rotation of the member 235, they will cause the projecting portions 240 to press against the inner surface of the cup 224, and in this way the speed of rotation of the gear 222 and thus of all of the driven components of the camera is regulated. The weights 238 may be drilled with holes, or any other suitable means may be provided for closely controlling the mass of these weights and thus controlling the speed of the camera.

Figure 21:
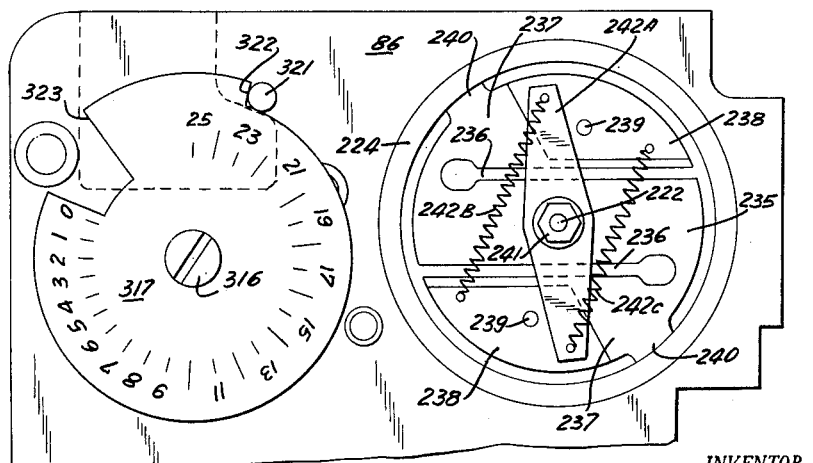
FIG. 21 is a fragmentary side elevation of one of the mechanism-carrying plates as seen from the outside and showing a counter disc and governor of the invention.

In the particular embodiment shown in FIG. 21, there is a bar 242A seated on a shoulder of the shaft 222 and spaced from the plastic governor plate 235, an end portion of the shaft 222 which is of reduced diameter extending through a central opening of the bar 242A and being threaded to receive the nut 241 so that this nut may be loosened to adjust the angular position of the bar 242A on the shaft 222 and then tightened when the angular position of the bar 242A is set. A pair of springs 242B are respectively fixed at one of their ends to the opposed ends of the bar 242A, rsepectively, as by being hooked onto a pair of pins respectively carried by the free ends of the bar 242A, and these springs extend as shown in FIG. 21 to the weights 238 to which they are respectively fixed as by being hooked onto pins respectively carried by these weights. Thus, the tension of the springs 242B can be regulated by regulating the angular position of the bar 242A, and in this way the force required to cause the wings 237 to move outwardly can be regulated so as to provide in this way an adjustable camera speed.

It will be noted that with the above-described governor assembly the governor is freely accessible at the exterior of the plate 86, so that in the event that any adjustments are necessary it is a simple matter to remove the pair of mechanism carrying plates 86 and 87 without separating them from each other and the governor is freely accessible for any adjustments. Of course, it is also true that during assembly of the structure the governor structure is very easily assembled and regulated during the initial manufacture for the purpose of precisely setting the speed of movement of the components of the camera. In the assembled camera the cup 224 which projects beyond the exterior surface of the plate 86 extends into the cutout 72 of the side wall of the inner casing member 70, but the governor is covered by the side wall of the outer casing member 60 so that in the finally assembled camera the governor is not visible.

Another embodiment of a governor according to the present invention is illustrated in FIG. 15 where the rotary member 235 is replaced by a rotary member 235' of substantially S-shaped configuration, and a pair of weights 238' are constrained by the member 235' and the rim of the cup 224 to rotate in the latter during rotation of the member 235', and by centrifugal force these free weights 235' will bear against the inner periphery of the cup to provide the speed regulation. The side wall of the casing member 60 will retain the weights 238' within the cup 224, or a separate cover may be provided for this purpose. Otherwise the embodiment of FIG. 15 is identical with the governor construction described above.

In the embodiment shown in FIGS. 16 and 17, the rotary governor member 235 instead of having weights fixed to the wings thereof has the free ends of a leaf spring 242 fastened to the wings of the governor member 235. These free ends of leaf spring 242 are suitably pointed so that they will dig into the material of the governor member 235. The shaft 222' is elongated and threaded, as indicated in FIG. 17, and this shaft extends through a central opening of the leaf spring 242. A nut 243 is threaded on to the free end portion of the shaft 222' and by advancing the nut 243 along the shaft 222' it is possible to increase the stress of the leaf spring and thus regulate the force necessary for the wings to move apart into engagement with the inner periphery of the cup. Thus, this leaf spring 242 and the nut 243 provide a means for adjusting the speed of rotation of the governor assembly and thus of the components of the camera, and if desired the nut 243 may be provided with suitable graduations which can be placed along side an index carried by the exterior of the leaf spring 242, so that in this way the mechanic may set the governor to whatever speed it is desired for the particular camera.

*Shutter assembly*

As was pointed out above, the gear 227 (FIGS. 9 and 11) of the gear train serves to transmit the drive to the shutter assembly of the camera. Referring to FIGS. 5, 8, 9, 11 and 12, it will be seen that the gear 227 driven by the gear train described above meshes with a gear 250 which is supported for rotation by a pin 252 fixedly carried by the frame member 115. This pin also supports for free rotation a gear 251 which is coaxial with the gear 250, and a circular plate 253 is formed with an opening through which the pin 252 extends and serves to separate the gears 250 and 251 from each other. This pair of coaxial gears 250 and 251, which are identical, mesh with a common gear 254 which is supported for rotation by a stationary elongated pin 265 fixedly carried by the frame 115. The pair of gears 250 and 251 respectively mesh with a pair of gears 255 and 256 (FIG. 12), and the gear 255 is formed with an elongated hub on which the gear 256 is freely turnable. A shaft 257 extends into the hollow hub of the gear 255, and this shaft 257 carries an eccentric cam which is formed with a bore into which extends a pin 260 which also extends into an opening of the gear 255, so that in this way the gear 255 and the shaft 257 are constrained to rotate together. The frame member 115 is formed with an opening which receives an end portion of the shaft 257, so that in this way the shaft is supported for rotation about its axis, and an additional structure described below also participates in the support of the shaft 257 for rotation about its axis.

The elongated hollow hub of the gear 255 extends beyond the gear 256, and the free end portion of this hub which extends beyond the gear 256 is fixed to a shutter blade 259. FIGS. 27 and 28 particularly show this construction. Thus, the free end of the hollow hub of the gear 255 is of a non-circular cross-section and extends into a mating non-circular opening of the blade 259 and is suitably upset so as to be fixed permanently with this shutter blade 259. Between the shutter blade 259 and the gear 256 is the second shutter blade 258 which is formed with an opening through which the shaft 257 freely extends. A stop pin 261 extends through an opening of the blade 258 into an opening of the gear 256 so that in this way the blade 258 is fixed to the gear 256 for rotation therewith. As is apparent particularly from FIGS. 27, 29 and 9 the pair of shutter blades 258 and 259 are of substantially semi-circular configuration. The pin 261 limits the turning of the shutter blade 258 together with the gear 256 in a clockwise direction with respect to the blade 259, as viewed in FIG. 27, and when the blade 258 is turned in a counter clockwise direction, as viewed in FIG. 27, with respect to the blade 259, the stop pin 261 will engage the opposite edge of the blade 259 to limit the rotation in this latter direction. Thus, FIG. 27 illustrates the minimum gap formed between the shutter blades, and this gap may be increased to a size somewhat greater than that illustrated in FIG. 9 for the purpose of increasing the exposure time. The pin 260 which serves to fix the shaft 257 to the gear 255 is clearly illustrated in FIG. 29 as well as the eccentric cam referred to below.

The gear 254 has an elongated axially bored hub 266 which receives the stationary pin 265 which is carried by the frame member 115 and which supports the gear 254 for rotation, and a coil spring 267 surrounds the elongated axial portion 266, abuts at one end against the gear 254, and abuts at its opposite end against the inner face of the plate 228 of the front wall assembly, so that in this way the spring 267 maintains the gear 254 in the position shown most clearly in FIG. 11 where it meshes with both of the gears 250 and 251, so that during operation of the camera these gears will rotate as a unit and will cause the gears 255 and 256 to rotate as a unit for the purpose of rotating the shutter blades 258, 259 without movement of the blades 258 and 259 one with respect to the other. Of course, the gears 255 and 256 are identical and they are also separated by a plate similar to the plate 253.

When the camera is not operating the shaft 257 and the gear 255 and shutter blade 259 therewith are always maintained in a given angular position in a manner described below, as long as the spring 185 is under some tension. Thus, the blade 259 will always have a given position when the camera is stopped and will thus serve as a reference point from which to adjust the gap between the shutter blades and thus adjust the exposure time. The elongated shaft portion 266 extends through an opening of the front plate 253 which is fixed to and spaced from the wall 288 by suitable spacer members, and at its free end portion which is located forwardly beyond the plate 53 the shaft 266 is fixedly connected with the knob 49 which carries the exposure time indicia referred to above. When the operator pulls on the knob 49 forwardly against the influence of the spring 267 the gear 254 will advance forwardly out of mesh with the gear 250 while remaining in mesh with the gear 251, and when thus holding the knob 49 forwardly of the plate 53 against the influence of the spring 267, the operator can turn the knob 49 and thus the shaft 266 so as to turn the gear 254 which at this time meshes only with the gear 251, so that only the latter gear will turn, and thus only the gear 256 will turn so that only the shutter blade 258 will turn with respect to the shutter blade 259 which remains stationary at this time, and thus it is possible to change the gap between the shutter blades and the exposure time in accordance with the values indicated by the scale carried by the exterior surface of the knob 49.

Of course, once the exposure time is adjusted the operator simply releases the knob 49 and the spring 267 returns the gear 254 to its inner position where it meshes with both of the gears 250 and 251 so as to again resume the normal operation of the shutter where both of the shutter blades will rotate together.

*Claw assembly*

As was pointed out above the shaft 257 is fixedly connected with an eccentric cam formed with a bore which receives the pin 260 which extends into the gear 255 so that in this way this latter gear is fixed to the shaft 257 for rotation therewith. This eccentric cam 270 is shown in FIG. 29 as well as in FIG. 12, and this cam serves to oscillate the film-advancing claw 271. The cam 270 as well as the claw 271 are located directly next to the front surface of the frame member 115, and this frame member fixedly carries a pivot pin 272 which extends through an opening of the claw 271 so as to form a pivot axis for the latter. A leaf spring 273 extends around the left edge of the frame member 115, and a screw member 274 (FIG. 26) fixes the leaf spring 273 to the frame member 115. This leaf spring 273 is formed with an elongated slot and the pivot pin 272 has its free ends located adjacent the ends of this slot at the front and rear faces of the frame member 115. A screw member 274 (FIG. 26) serves to fix the leaf spring to the frame member 115 and the rear face of the latter. Thus, the portion of the leaf spring 273 which overlaps the claw 271 at the front face of the frame member 115 is free to resiliently yield forwardly and rearwardly away from and toward the front face of the frame member 115. The opening of the claw 270 through which the pivot pin 272 passes has a rather loose fit with respect to the pivot pin 272 so that in this way the claw 271 is capable of turning upwardly from and back toward the plane of FIG. 25, which is to say forwardly away from and rearwardly back toward the front face of the wall 115, for a purpose described below.

As may be seen from FIGS. 5 and 32, the claw 271 has a lower end portion 275 which functions in a manner described below. The claw 271 also has a free end portion 276, and as is evident from FIGS. 5 and 26 a claw tooth 277 extends rearwardly from this free end portion 276. This tooth extends rearwardly through the exposure aperture 114 of the film gate, and this aperture 114 has an elongated portion 114' along the right end thereof, as viewed in FIG. 26, and it is in this elongated portion 114' that the tooth 277 of the claw oscillates.

As referred in FIG. 25, it will be seen that the center of the pivot 272 is located above a horizontal line drawn through the turning axis of the shaft 257 perpendicularly to the path along which the film 180 is advanced by the claw 271. As a result, when the claw tooth 277 is at the lower end of its movement it will be located at its furthest extent to the left, as viewed in FIG. 25 and to the right, as viewed in FIG. 26. The film 180 is guided for movement along the film gate between the shoulders 129 and 130 along the rear surface of the frame member 115, and this frame member is provided with slight shoulders which extend longitudinally in the path of movement of the film between the shoulders 129 and 130 to serve in part to guide the film during movement by the tooth 277. Because the center of turning of the claw is displaced upwardly from a horizontal line passing through the center of the shaft 257 perpendicularly to the path of movement of the film, the tooth 277 when it reaches the bottom of its stroke will also be located nearest to the right edge of the film 180, as viewed in FIG. 26 and it will press against the right edge of the perforation in which it is located so as to urge the film against a pair of stops 278 which are located along the right edge of the film, so that in this way the claw also serves to very precisely position the film laterally. With the construction of the claw described above, when the claw turns back up to its starting position, the film remaining stationary so as to be exposed during this time, the tooth will simply ride along the rear face of the film until it enters the next upper perforation of the film. The tooth 277 will be permitted to do this because when it is oscillated upwardly by the rotating cam 270 the entire claw can turn forwardly away from the frame member 115 in opposition to the force of the leaf spring 273 until the tooth reaches the next upper notch and then this leaf spring will turn the claw back against the frame member 115 so that the tooth 277 will now enter into the next perforation so as to again advance the film during the next downward movement of the claw.

*Aperture assembly*

As may be seen from FIG. 12, the shaft 257 extends as its end distant from the frame member 115 into a bore of a gear 281. This gear 281 is itself turnably supported in an opening of the plate 228 of the front wall assembly of the camera. Thus, it is the bore of the gear 281 which also participates in the support of the shaft 257 for rotation about its axis. At its end which projects inwardly beyond the plate 228 this gear 281 is of non-circular cross-section and extends into a mating non-circular central opening of a plate 280, and this end of the gear 281 is upset so as to rivet the plate 280 to the gear 281 for rotation with the latter. The gear 281 meshes with a gear 282 which is supported at the front surface of the plate 228 for rotation about its axis by a hollow pin 284 which is fixed to and extends forwardly from the plate 228. This gear 282 is fixed coaxially with the disc 51 which is turned by the operator in a manner described above for setting the exposure aperture of the camera. Thus, whenever the disc 51 is turned around the stationary hollow pin 284 the gear 282 will turn with the disc 51 so as to turn the gear 281 and thus turn the plate 280.

As may be seen particularly from FIG. 5 the plate 280 is formed along a circle whose center is the center of the plate 280 with a series of openings 289 which are of different sizes, and within this latter circle of openings there is a concentric circle of openings 288 all of the same size. The hollow pin 284 is closed (FIG. 31) by a plug 287 against which one end of a spring 286 abuts, the other end of this spring urging a ball member 285 against the plate 280 into one of the openings 288, so that in a way a detent structure is provided for precisely determining the angular position of the plate 280. The plate 228 is formed with an opening 283 whose center is located in the optical axis, and this optical axis is located at a radial distance from the center of the plate 280 equal to the radius of the circle along which the openings 289 are located. Thus, whenever the operator turns the disc 51 he will be positioning in alignment with the optical axis a selected aperture 289 of a predetermined size which will thus control the exposure aperture size. The ball 285 will guarantee that the selected opening 289 is precisely positioned along the optical axis. The disc 51 is also shown in FIG. 30 in front of the plate 228.

Objective assembly

As is apparent from FIGS. 5, 30, 31, and 10, the plate 228 carries a nut 290. This nut 290 has a portion extending into the opening 283 and upset in this opening so as to have a fairly tight riveted connection with the plate 228. This tight friction fit is such that in the factory a mechanic can apply a wrench to the nut 290 so as to turn the latter to a given angular position and the friction of the fit of the nut 290 in the opening 283 of the plate 228 is such that the nut 290 will reliably remain in the angular position to which it is turned by the mechanic in the factory.

The objective 46 has a rear tubular threaded portion 291 which is received in the nut 290, so that in this way the objective is supported for turning movement and for axial focussing movement by the threads of the nut 290. The rear tubular portion of the objective extends freely through an opening of the front plate 253 into the nut 290 which is located behind the front plate 53. The projection 47 of the objective turns between a pair of stops 292 which are threadedly carried by the threaded openings 293 of the front plate 53, and when the stop 47 is located adjacent the upper stop member 292 the index member 47 will be aligned with the infinity graduation of the focussing scale on the front of the plate 53. With the objective thus turned to an angular position which indicates infinity on the distance scale, the mechanic in the factory turns the nut 290 while maintaining the objective 46 stationary until the objective actually is focussed at infinity which is a process carried out in a known way very quickly in the factory, and thus the objective is very quickly set in the factory so as to be properly focused in accordance with the indications of the scale on the front face of the plate 53. After the objective is thus focused at infinity, the index 47 is turned down to a lesser distance such as three feet, for example, and the focus is again checked in the factory to make certain that the objective is properly focused, and this is all that is required with the structure of the invention for properly focussing the objective. As was pointed out above, the nut 290 will reliably remain in the angular position to which it is adjusted in the factory as a result of the high friction of the fit which the nut has in the opening 283 of the plate 228.

Counter assembly

As was pointed out above, the internal ring gear 210 (FIG. 8) which is fixed to the spring barrel 188 for rotation therewith includes a cam portion 213, and as the spring barrel turns this cam portion will, once during each revolution of the spring barrel 188, actuate a structure for counting the revolutions of the spring barrel and for indicating directly the feet of film left to be exposed. Referring to FIGS. 4, 8, and 18, it will be seen that the cam 213 acts on a lever 300 which is pivotally carried by a pivot pin 301 which is fixed to the plate 87, the lever 300 extending between the plate 87 and the barrel 188 so as to engage the exterior periphery of the ring gear 210. The plate 87 carries a stationary pin 302 around which a wire spring 303 is wound, and one end of this spring bears against the spacer pin 93 while the other end of this spring 303 engages beneath a lug 304 extending from the lever 300 so that the spring 303 urges the lever 300 in a counter clockwise direction, as viewed in FIGS. 8 and 18, and thus the bottom projecting end of the lever is maintained by the spring 303 in engagement with the cam 210, 213. The lever 300 carries a pivot pin 305 which turns with the lever, and a wire spring 306 is wound around the pin 305 with one end of the wire spring extending beneath a lug 307 struck from the lever 300 while the other end of the wire spring 306 extends beneath a tongue 308 of a pawl 309 which is pivotally supported by the pin 305, so that the spring 306 urges the pawl 309 to turn in a counter clockwise direction on the pin 305. As a result, the free end of the pawl 309 will be maintained in engagement with a ratchet wheel 310.

Figure 19:
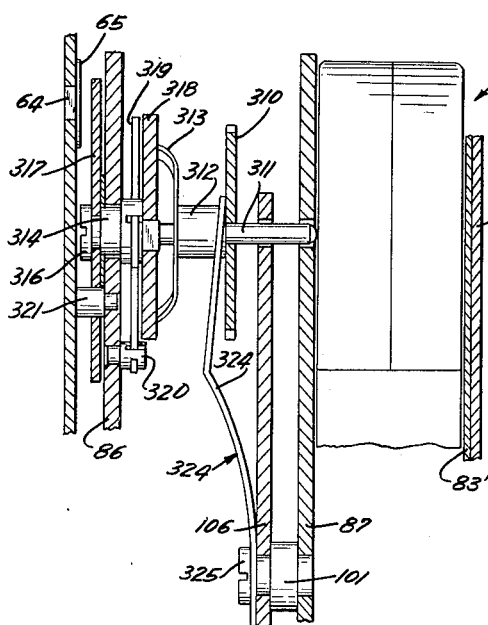
FIG. 19 is a fragmentary section taken along line XVIV—XVIV of FIG. 18 in the direction of the arrows, the pawl structure of FIG. 18 being omitted from FIG. 19 for the sake of clarity.
Figure 20:
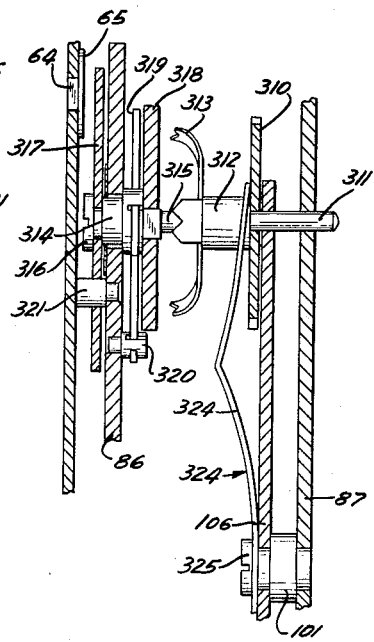
FIG. 20 shows the structure of FIG. 19 in a different position.

Referring now to FIGS. 18 and 20 as well as FIG. 4, it will be seen that the ratchet 310 is fixed to a shaft 311 having an elongated portion extending to the right of the ratchet wheel 310, as viewed in FIGS. 19 and 20, and this ratchet wheel 310 may be soldered for example, to the shaft 311. This shaft 311 extends through an opening of the bridge 106 across the space between the bridge 106 and the plate 87 and through an opening of the plate 87 into the magazine compartment of the camera. Thus, as is evident from FIG. 19 when the magazine 85 is placed in the camera it engages the plate 87 and displaces the shaft 311 to the left from the position thereof indicated in FIG. 20, as viewed in FIGS. 19 and 20, while when the magazine is not in the camera the shaft 311 will have the position indicated in FIG. 20. FIG. 19 illustrates the cover 41 as well as an elongated strip 83' of foam rubber or the like fixed to the inner surface of the cover 41 by any suitable adhesive or the like and extending diagonally across the cover 41 from its upper right to its lower left corner, as viewed in FIG. 3 and as described above, so that this strip 83' prevents light which enters through the window 81 from reaching the film which is exposed.

The shaft 311 has an enlarged, axially bored portion 312 extending to the left of the ratchet wheel 310, as viewed in FIGS. 19 and 20, and also the enlarged portion 312 fixedly carries on an annular shoulder a pronged springy member 313 having, in the illustrated example, three springy fingers (FIG. 8) which terminate in relatively sharp teeth which are particularly visible in FIG. 20.

A stepped shaft 314 extends through an opening of the plate 86 which is coaxial with the shaft 311, and this shaft 314 has a shoulder engaging the inside face of the plate 86. The shaft 314 has a reduced elongated portion 315 extending slidably into the axial bore of the enlarged portion 312 of the shaft 311, and thus this shaft 311 is capable of sliding axially in both directions along the reduced portion 315 of the shaft 314. A screw 316 is threaded into the free end of the shaft 314 on the outside of the plate 86, and this screw 316 serves to retain on the shaft 314 and to fix to the latter the counter disc 317 which bears the indicia shown most clearly in FIG. 21. The shaft 314, in addition to having the counter disc 317 fixed thereto, also has a plastic disc 318 fixed thereto for rotation therewith. As is shown particularly in FIG. 4, the the counter disc 317 and the plastic disc 318 have non-circular central openings mating with correspondingly shaped non-circular portions of the shaft 314, so that in this way the disc 317 and the plastic plate 318 are constrained to rotate with the shaft 314.

A light spiral spring 319 is coiled around the shaft 314 between the plate 86 and the plastic disc 318, and the inner end of the spiral spring 319 is fixed directly to the shaft 314, while the outer end of the spiral spring 319 is fixed to a pin 320 which is fixedly carried by the plate 86. This spring 319 urges the shaft 314 and the counter disc 317 therewith in a clockwise direction, as viewed in FIGS. 18 and 21, so that in this way the radial edge portion 322 of the disc 317 is urged by the spring 319 against the stop pin 321 which is fixedly carried by the plate 86 at the exterior thereof, and when the shaft 314 is released to the spring 319 this spring will automatically zero the disc 317 to place the latter in the position indicated in FIG. 21. In this "zero" position of the disc 317 the numeral 25 will be visible through the window 64 of the casing means 40, and this is the starting position of the disc indicating to the operator that 25 feet of film remain to be exposed.

As is shown most clearly in FIG. 21, the disc 317 in addition to having the radial edge 322 is formed with a notch 323 for a purpose described below.

The counter means further includes an elongated leaf spring 324 which is fixed by a screw 325 to the spacer member 101 which spaces the bridge 106 from the plate 87 and this leaf spring 324 is located at the outside of the space between the bridge 106 and the plate 87 next to the exterior surface of the bridge 106. As is shown most clearly in FIG. 4, the leaf spring 324 has three projecting end portions 326, 327 and 328. The end portions 326 and 327 press against the ratchet wheel 310 with the shaft 311, 312 extending between the projections 326, 327, and thus the spring 324 urges the ratchet wheel 310 together with the shaft 311, 312 to the position illustrated in FIG. 20, and this is the rest position of the counter means. The third projection 328 of the leaf spring 324 is curved toward the plate 87 and is located along the teeth of the ratchet wheel so that this end portion 328 (FIG. 8) of the spring 324 acts as a pawl and prevents the ratchet wheel from turning in a clockwise direction, as viewed in FIG. 8, during movement of the pawl 309 to the left, as viewed in FIG. 8, such leftward movement of the pawl 309 taking placing during counter clockwise turning of the lever 300 while its free end rides along the rotary cam 210, 213.

During each revolution of the spring barrel 188 the cam 213 will engage the lever 300 to oscillate the latter once through a complete cycle, and during movement through this cycle the pawl 309 will cooperate with the teeth of the ratchet wheel 310 to turn the latter in a counter clockwise direction, as viewed in FIGS. 8 and 18, through a distance equal to one tooth, and the spring portion 328 of the leaf spring 324 will prevent turning of the ratchet wheel 310 in a clockwise direction, as viewed in FIGS. 8 and 18. When there is a magazine 85 in the camera, as indicated in FIG. 19, the magazine itself will cause the shaft 311 to be displaced from the position of FIG. 20, to that of FIG. 19, so that the prongs of the springy member 313 will dig into the plastic wheel 318 and thus will transmit, at this time, turning of the ratchet wheel 310 to the plastic wheel 318, and thus through the shaft 314 to the counter disc 317, and the turning of the counter disc together with the shaft 314 and the plastic disc 315 takes place in opposition to the spiral spring 319. The transmission ratio of the gearing to the counter structure through the cam 210, 213 as well as to the magazine through the driving pin 169 is such that a foot of film will be exposed during each actuation of the ratchet wheel 310 by the pawl 309, and thus the indicia on the disc 317 will indicate through the window 64 to the operator the number of feet of film remaining to be exposed. The exterior surface of the plate 86 which is exposed by the notch 323 when the "0" value of the scale on the disc 317 has reached the window 64 is colored red, so that should the operator operate the camera too long so that all of the film is exposed and no more film remains, the operator will see the color red through the window 64 and will know that it is necessary to change the magazine so as to place a fresh supply of unexposed film in the camera. Of course, as soon as the magazine is removed the spring 324 returns the structure from the position of FIG. 19 to that of FIG. 20, and as soon as the prongs of the springy member 313 leave the disc 318 the spiral spring 319 returns the shaft 314 and the structure carried thereby to their starting position so that the numeral 25 of the disc 317 is again aligned with and visible through the window 64.

The shaft 314 is turnable in the opening 299 of plate 86, this opening 299 being shown in FIG. 4.

FIGS. 23 and 24 illustrate another embodiment of a counter means according to the invention. In this embodiment the disc 330 which carries the counter indicia visible through the window of the casing is itself in the form of a ratchet wheel. A screw member 331 connects the disc 330 to the exterior surface of the plate 86 in a manner which allows the disc 330 to be turned with respect to the screw member 331. The disc 330 is provided with ratchet teeth 332 which have the configuration shown in FIGS. 23 and 24. Thus, not only are these teeth slanted at their outer peripheries in the manner of conventional teeth, but in addition they slant in towards the plate 86 for a purpose described below. The embodiment of FIGS. 23 and 24 includes a lever 333 which corresponds to the lever 300 and which is oscillated by a rotary cam 334 which rotates with the spring barrel 335, so that the lever 333 is oscillated in the same way as the lever 300. The lever 333 is pivotally supported by a pin 348 carried by the plate 87 and, as is diagrammatically indicated in FIG. 23, a spring 349 urges the lever 333 to turn in a counter clockwise direction about the pin 348, as viewed in FIG. 23, so as to maintain the bottom free end of the lever 333 in engagement with the rotary cam 334.

At its end distant from the cam 334, the lever 333 carries a pin 336 on which a pawl 337 is mounted for turning movement about the pin 336, and as is particularly evident from FIG. 24, the pawl 337 extends through a cutout of the wall 86 so as to have its end 338 in engagement with the teeth 332 of the ratch wheel and also counter wheel 330. The cutout of the wall 86 is long enough to allow the lever 333 and the structure carried thereby to move without hindrance. A spring 339 is coiled around the pin 336, is fixed at one end to the lever 334, and at its other end bears against an edge of the pawl 337 so as to urge the latter in a counter clockwise direction about the pin 336, as viewed in FIG. 23, and thus the tooth 338 of the pawl 337 is maintained in engagement with the teeth 332 of the ratchet wheel 330 and it is clear that the ratchet wheel will be stepped around during each oscillation of the lever 333 by the cam 334, so as to give an indication of the film footage remaining to be exposed, in the same way as the disc 317.

A pin 341 cooperates with the ratchet teeth 332 to prevent the counter wheel 330 from being zeroed by an unillustrated spiral spring in the same way as the above-described structure. This unillustrated spring will zero the counter wheel 330 when the pin 341 is out of engagement with the teeth of the ratchet wheel, and the slanting of the teeth inwardly toward the plate 86 enables the teeth of the ratchet wheel to ride over the pin 341 but not to turn back with respect to the same.

The pin 341 is slidable in a hollow cylindrical member 342 and the enlarged left head end of the pin 341, as viewed in FIG. 24, limits the movement of the pin 341 to the right, as viewed in FIG. 24. A plug 343 closes the left open end of the cylinder 342, and a spring 344 within the hollow cylinder 342 bears at one end against the plug 343 and at its opposite end against the pin 341 to urge the latter to the position indicated in FIG. 24, but during the turning of the ratchet wheel 330 the successive teeth thereof will momentarily move the pin 341 in opposition to the spring 344 so that the pin 341 can snap behind a next tooth as the wheel is advanced by the pawl 337, 338.

The cylinder 342 fixedly carries at its exterior a coaxial frustoconical member 346, and a spring 345 is coiled around the exterior of the cylinder 342 and bears with one end against the frustoconical member 346. The other end of the spring 345 bears against a guide sleeve 347 fixedly carried by the plate 86 and guiding the cylinder 342 for axial movement. The plate 87 is provided with a coaxial opening through which the cylinder 342 slidably extends, and as is indicated in FIG. 24, the magazine 85 when in the camera next to the plate 87 will displace the cylinder 42 in opposition to the spring 345 to the position indicated in FIG. 24 so as to place the pin 341 in the path of turning of the teeth of the ratchet wheel 330, so that this pin is now effective to prevent the return of the ratchet wheel to its zero position by the unillustrated spring, after the rachet wheel is advanced by the pawl 337, 338. When the magazine is removed, the spring 345 can expand and will displace the cylinder 342 to the left, as viewed in FIG. 24, so as to locate the pin 341 out of the path of movement of the ratchet wheel 330, and now the unillustrated spring can zero the ratchet wheel so that the parts are again returned to their starting position.

It may happen that the crest of the cam 334 is in engagement with the tip of the lever 333 so that this lever is turned to its end position where the pawl 338 is in its extreme right position, as indicated in FIG. 23, and in this position of the cam 334 and the lever 333 it may happen that the camera is stopped and the magazine is removed. Thus, it may happen that the pawl 337, 338 will not move away from and out of engagement with the ratchet wheel even though the magazine is removed in this one angular position of the cam 334, and the spring ordinarily would not be able to zero the ratchet wheel 330. However, with the structure of FIGS. 23 and 24 the pawl 337 has a projection 340 which is located in the path of movement of the frustoconical member 346 during expanding of the spring 345 when the magazine 84 is removed from the camera, and this frustoconical member 346 will strike against the projection 340 and turn the tooth 338 of the pawl 337 downwardly away from the ratchet teeth of the ratchet wheel, even if the crest of the cam 334 should happen to be in engagement with the tip of the lever 333 when the magazine is removed, and thus even in this case the return of the counter wheel 330 to its zero position by the zeroing spring is guaranteed.

*Control apparatus and operation*

As was pointed out above, in connection with FIG. 1, the camera includes an operating button 45 which is actuated by the operator for the purpose of operating the camera. The button 45 (FIG. 5) extends through an opening 353 in the front plate of FIG. 3 of the camera. The wall 228 fixedly carries a plurality of spacer pins 350, and a plurality of screws 351 respectively extend through openings 352 of the plate 53 into threaded bores of the spacer pins 350 which are carried by the wall 228, so that in this way the front plate 53 is fixed to and carried by the wall 228. This wall is formed with an opening 354 coaxial with the opening 353, and the cylindrical button 45 is guided by the pair of openings 353 and 354 for rotary and axial movement. The button 45 is provided at its front face with an index dot 361 which may be red, for example, and this button is provided at its rear with a bore which receives a spring 356 (FIG. 5), this spring pressing against a ball 355 for a purpose described below. Also, a pin 357 is fixed to the rear end of button 45, extends parallel to the axis of the pin 45 beyond the rear end of the latter, and this pin 357 is displaced by 90° with respect to the index dot 361. Thus, as may be seen from FIGS. 9 and 32, when the index dot 361 is in its uppermost position, the pin 357 will be at the elevation of the axis of the operating button 45.

The pin 357 extends through a central opening 358 of a plate 359 which is maintained against the rear end of the button 45, and the opening 358 is large enough to allow the pin 357 to turn freely with respect to the plate 359. This plate is formed with small openings 360 a selected one of which is engaged by the spring-pressed ball 355 so as to maintain the button 45 in a selected angular position.

The pin 357 extends through a small opening 297 of a plate 364 which is located on the side of the plate 359 opposite from the button 45, and this pin 357 projects to the rear beyond the plate 364 and is soldered or otherwise fixed to the latter, so that the plate 364 serves to maintain the plate 359 between this plate 364 and the button 45 while at the same time the plate 364, the pin 357, and the button 45 can turn as a unit about the axis of the button 45 with respect to the plate 359.

The frame member 115 is formed in its front face with an elongated recess 298 (FIGS. 5 and 9), and it is also formed with an elongated notch 365 and a cutout 366. The plate 359 has one lateral projection 362 which is located in the notch 365 and an opposite lateral projection 363 which is located in the notch 366, so that in this way the plate 359 is maintained stationary by the frame member 115 while the button 45 together with the pin 357 can turn with respect to the plate 359. The length of the notches 365 and 366 is such, however, that the button 45 together with the plate 359 can be depressed inwardly toward the interior of the camera by the operator.

The frame member 115 is formed at the inner end of the left notch 366 thereof with an upwardly directed notch 367 for a purpose described below.

Within the recess 298 in the front of the frame member 115, is located an elongated leaf spring 368 which is fixed at its bottom end by a screw 369 to the frame member 115. This leaf spring 368 bears against the plate 364 for urging the button 45 together with the plate 359 outwardly to their outer rest position, and the projections of the plate 359 engage the rear surface of the wall 228 to limit the outward movement of the bottom 45 by the leaf spring 368. This leaf spring is formed with an elongated substantially vertical slot 370 through which the pin 357 extends, and the frame member 115 is formed with a horizontal slot 373 into which the pin 357 extends.

The leaf spring 368 also acts as a control lever, as will be apparent from the description below, and the control assembly includes in addition to the control lever 368 a stop lever 374, this lever 374 having between its ends a forwardly directed projection 375 which is at the elevation of the lateral projection 363 of the plate 359 behind this lateral projection 363, as is evident from FIGS. 9 and 32. A pin 376 extends through an opening at the bottom end of the lever 374 and is fixedly carried by the plate 87 so as to support the lever 374 for turning movement against the inner face of the plate 87 between the latter and the spring barrel 188, and a wire spring 377 is wound around the pin 376, bears with one end against the spacer pin 92, and bears with its other end behind a lug 378 struck from the lever 374, so as to urge this lever 374 forwardly toward the plate 228.

In the rest position of the camera the spring 377 locates the lever 374 in its forwardmost position with the projection 375 directly behind the projection 363 and the button 45 located in its outmost position, and in this position a shoulder 379 of the lever 374 is located directly beneath the claw 71 and is engaged by this claw, so that the stop lever 374 provides the stop surface against which the spring 185 urges through the gearing described above in the claw 271, and thus this shoulder 379 of the lever 374 determines the angular position of the claw and shutter when the camera is stopped, assuming, of course, that the spring is tensioned. Thus, it is the cooperation of the shoulder 379 with the claw 271, when the spring is tensioned, that determines the angular position of the shutter blade 259 whenever the camera is stopped and thus provides a reference point with respect to which the shutter blade 258 is turned upon turning of the knob 49, as described above, so as to provide the selected exposure time.

As is shown most clearly in FIG. 5, the front plate 53 carries the letter M at the uppermost part of the opening 353, the letter L on the left of this opening, the letter S on the bottom of the opening, and a dot slightly to the right of the letter M. These latter indicia permit the operator to position the button 45 in selected angular position for producing various types of operation.

Figure 9:
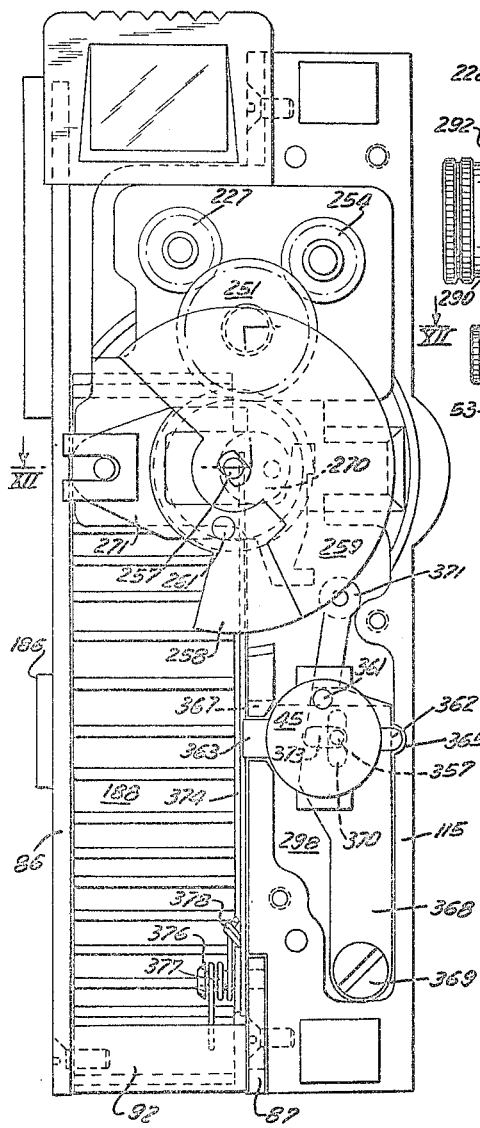
FIG. 9 is a front elevation of the camera with some of the plates of the front wall assembly removed to clearly show the structure behind these plates.

Assuming that the index dot 361 is in its uppermost position, as shown in FIGS. 9 and 32, where this dot is of course aligned with the letter M, then the operator knows that the camera is capable of being operated to take motion pictures. It will be noted that in this position the pin 357 is aligned with the horizontal spot 373 and is at the right end of the latter so that the combined control lever and leaf spring 368 is in the angular position illustrated in FIG. 9 and in solid lines in FIG. 32. In this position the operator need only push the button 45 inwardly toward the interior of the camera, and the result is that the projection 363 of the plate 359 will act through the projection 375 on the lever 374 to turn the latter inwardly toward the interior of the camera so that the shoulder 379 moves away from the claw 271, and now this claw is released to the spring 185 and the camera will operate as long as the operator maintains the button 45 depressed.

In the event that the operator wishes to continue the operation of the camera without maintaining his finger on the button 45, it is only necessary for the operator to turn the button 45 slightly in a clockwise direction from the position of the button indicated in FIGS. 9 and 32. Thus, as may be seen most clearly from FIG. 9, with the button 45 depressed inwardly toward the interior of the camera, if the operator should turn this button in a clockwise direction, as viewed in FIG. 9, the pin 357 in the right end of the slot 373 will act as a fulcrum, and there is sufficient clearance of the projection 362 in the notch 365 to allow a slight turning of the plate 359 to take place so that the projection 363 will enter into the upwardly directed notch 367 which communicates with the notch 366, and with this projection 363 in the notch 367, the spring 377 cannot move the lever 374 forwardly to its rest position, and thus the operator can now release the button which will remain held in its inner position and the camera will continue to operate. Thus, the operator knows that by aligning the dot 361 with the dot located slightly to the right of the letter M, and after the button 45 has been depressed inwardly toward the interior of the camera, the camera can be locked in an operating position and will continue to operate even though the button 45 is not engaged by the operator. Of course, when it is desired to stop the operation it is necessary for the operator to return the button to the angular position shown in FIGS. 9 and 32 where the dot 361 is again aligned with the letter M, and now the projection 363 is out of the notch 367 so that upon release of the button 45 the spring 377 will turn the lever 374 forwardly and its projection 375 will act through the projection 363 on the plate 369 and the button 45 to return the parts to their rest position where the shoulder 379 of the lever 374 extends beneath the claw 271 to stop the operation thereof.

When the button 45 is in its rest position it is maintained forwardly by the spring 368 in a position where the rear end of the pin 357 is just in front of the surface of the frame member 115 inside the recess 298 thereof and the pin 257 at this time does not extend into the slot 273. With the button in this position, the operator can of course turn the button so that the index dot 361 is aligned with the letter L. This will locate the pin 357 at an elevation higher than the slot 373, and should the operator now depress the button 45, the pin 357 will simply engage the surface of the frame member 115 but will not enter into the slot 373 so that it is not possible for the operator at this time to depress the button 45 through a distance sufficient to turn the lever 374 rearwardly out of engagement with the claw, and thus in this position of the parts the camera is locked against operation.

The operator can also turn the button 45 so that the index dot 361 is aligned with the lower letter S on the front plate 53. In this position the pin 357 will be aligned with the left end of the slot 373, as viewed in FIGS. 5, 9, and 32. The camera is now set for taking still pictures. By locating the button in the position where the dot 361 is aligned with the letter S, the pin 357 has of course been turned so as to turn the combined spring and control lever 368 about the shank of the screw 369 in a counter clockwise direction to the dot-dash line position indicated in FIG. 32, and it will be noted that in this position the upper end 371 of the lever 368 and the pin 372 carried by this upper end of the lever 368 are aligned with the lower end 275 of the claw 271. As is particularly evident from FIG. 32, the top end of the lever 368 and the pin 372 fixed thereto extend to an elevation slightly higher than the bottom end of the claw 271 when the latter is held in its stopped position by the shoulders 379 of the lever 374.

It must be remembered that at this time, before the button 45 has been depressed by the operator and while the dot 361 is aligned with the letter S, the pin 372 is located forwardly of and out of engagement with the lower end 275 of the claw 271.

When the operator now presses the button inwardly the projection 363 will act on the projection 375 to move the stop lever 374 inwardly away from the claw so that it will start to move through one cycle, and the continued inward movement of the button 45 will place the pin 372 against the frame 115 before a cycle of the claw 271 has been completed, so that when a cycle has been almost completed the claw will move down and have its lower end 275 engaging the pin 372 so that it cannot continue to move downwardly, and thus a single exposure has been made on a single frame. The operator will now release the button 45, and due to the fact that the claw 271 is slightly higher than the position in which it is stopped by the lever 374, this lever can move with its shoulder 375 beneath the claw which only moves to a slight distance into engagement with the shoulder 379 and the camera remains stopped. The operator may again depress the button 45 with the parts remaining in the same position to make another still exposure, and in this way the camera is adapted to make still pictures, if desired.

As was pointed out above, the portion 276 of the claw 271 is provided with the rearwardly directed film engaging tooth 277, and the rear edge of this tooth 277 is inclined downwardly toward the rear, so that during upward movement of the claw the tooth 277 will ride along the front face of the film from one perforation to the next perforation, while during downward movement of the claw this tooth will remain in a perforation to advance the film in the manner described above. As was pointed out above in connection with FIG. 26, the claw tooth 277 turns so that at the bottom of its stroke it is located nearest the stop pins 278 and engages the end of the perforation in which it is located so as to reliably maintain the film position laterally, and the slots 183 of the pressure plate 181 of FIG. 13 or 164 of the pressure plate 162 of FIG. 7 are not only long enough to provide unrestrained movement of the claw tooth, they are also wide enough to provide no interference to the lateral displacement of the claw tooth.

When the camera is in its fully assembled condition, the front walls of the casing members 60 and 70 extend into the space between the plate 228 and the front plate 53, and the same is true of the front wall of the casing member 41, and it will be noted that these front walls are provided with specially shaped notches at their free edges so as to accommodate the various components which extend between the plates 53 and 228. As is particularly apparent from FIGS. 1, 3 and 5 the front walls of the casing members 60 and 70 extend between the plates 53 and 228 behind the aperture disc 51.

It will be understood that each of the elements described above, or two or more together, may also find a useful application in other types of cameras differing from the types described above.

While the invention has been illustrated and described as embodied in motion picture cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letter Patent is:

1. In a motion picture camera, in combination, a toothed counter wheel; support means supporting said wheel for rotation about its axis; a yieldable pin having an operating position cooperating with said wheel to limit the latter to one direction of rotation; means carried by said support means for placing said pin in said operating position thereof only when a magazine is in the camera; and pawl means cooperating with said wheel for indexing the latter during exposure of film in the camera, whereby when a magazine is out of the camera said pin will not be in its operative position.

2. In a motion picture camera, in combination, a toothed counter wheel; support means supporting said wheel for free rotation; spring means cooperating with said wheel for urging the latter to a predetermined zero position; a spring-pressed sleeve extending into a magazine compartment of the camera and supported by said support means for movement outwardly of said magazine compartment toward the counter wheel when a magazine is placed in the compartment and engages said sleeve to move the latter outwardly of said compartment; a pin yieldably carried by said sleeve and cooperating with said wheel to maintain the latter turning in one direction only when said sleeve is moved by a magazine in the compartment; a pawl cooperating with said wheel for indexing the latter around its axis to indicate the film footage remaining to be exposed; and means turned by said sleeve and engaging said pawl upon return of said sleeve to a rest position when a magazine is removed from said compartment for placing said pawl out of engagement with said wheel so that the latter will be reliably returned to its zero position irrespective of the position of the pawl when magazine is removed from the camera.

3. In a motion picture camera, in combination, support means; a ratchet wheel supported for rotary movement by said support means; lever means cooperating with said ratchet wheel for advancing the latter through a given angular increment each time said lever means is turned through a given stroke, said lever means being turnably carried by said support means; a rotary spring barrel also carried by said support means; and cam means directly connected to and carried by said spring barrel for rotary movement therewith and cooperating with said lever means for cyclically oscillating the latter, during running down of said spring barrel, through oscillation each of which is equal to said stroke, said lever means including a lever engaged by said cam means and a pawl turnably carried by said lever and engaging said ratchet wheel.

4. In a motion picture camera, in combination, support means; a ratchet wheel supported for rotary movement by said support means; lever means cooperating with said ratchet wheel for advancing the latter through a given angular increment each time said lever means is turned through a given stroke, said lever means being turnably carried by said support means; a rotary spring barrel also carried by said support means; and cam means directly connected to and carried by said spring barrel for rotary movement therewith and cooperating with said lever means for cyclically oscillating the latter, during running down of said spring barrel, through oscillations each of which is equal to said stroke, said cam means having a hollow central opening provided with a toothed periphery forming an internal ring gear adapted to form part of a drive for a take-up spool of the camera.

5. In a motion picture camera as recited in claim 4, said ratchet wheel also being supported by said support means for axial movement; a counter wheel also supported for rotary movement by said support means, said counter wheel being coaxial with said ratchet wheel; spring means cooperated with said counter wheel for zeroing the latter; and a pin extending axially from said ratchet wheel into a magazine compartment of the camera to be engaged by a magazine introduced into the same, so that the magazine pushes said pin and said ratchet wheel therewith along the axis of said ratchet wheel when the magazine is introduced into the camera; and means cooperating with said ratchet wheel and with said counter wheel for transmitting turning of said ratchet wheel to said counter wheel only when said ratchet wheel has an axial position determined by location of a magazine in the camera.

6. In a motion picture camera as recited in claim 4, a counter wheel supported for wheel rotation for free rotation by said support means; a spring cooperating with said counter wheel for zeroing the latter; a plastic wheel fixed coaxially to said counter wheel for rotation therewith; said ratchet wheel being fixed coaxially to said counter wheel for rotation therewith and said ratchet wheel being supported by said support means for axial as well as rotational movement; a toothed leaf spring fixed to said ratchet wheel and engaging said plastic wheel only when said ratchet wheel has moved along its axis to a pre-determined position toward said plastic wheel, so that said counter wheel will turn with said ratchet wheel only when said ratchet wheel is in said predetermined axial position; and a pin fixed to said ratchet wheel and extending into a magazine compartment of the camera to be engaged by introduction of a magazine into said compartment to move the ratchet wheel into said predetermined position upon introduction of a magazine into said compartment, whereby the counter wheel will be connected to the ratchet wheel for rotation therewith by introduction of a magazine into the camera.

7. In a motion picture camera as recited in claim 4, a counter wheel supported for wheel rotation for free rotation by said support means; a spring cooperating with said counter wheel for zeroing the latter; a plastic wheel fixed coaxially to said counter wheel for rotation therewith; said ratchet wheel being fixed coaxially to said counter wheel for rotation therewith and said ratchet wheel being supported by said support means for axial as well as rotational movement; a toothed leaf spring fixed to said ratchet wheel and engaging said plastic wheel only when said ratchet wheel has moved along its axis to a predetermined position toward said plastic wheel, so that said counter wheel will turn with said ratchet wheel only when said ratchet wheel is in said predetermined axial position; a pin fixed to said ratchet wheel and extending into a magazine compartment of the camera to be engaged by introduction of a magazine into said compartment to move the ratchet wheel into said predetermined position upon introduction of a magazine into said compartment, whereby the counter wheel will be connected to the ratchet wheel for rotation therewith by introduction of a magazine into the camera; a leaf spring carried by said support means and urging said ratchet wheel away from said position thereof to an idle position where the plastic wheel is not connected to the ratchet wheel for rotation therewith.

8. In a motion picture camera as recited in claim 4, a counter wheel supported for wheel rotation for free rotation by said support means; a spring cooperating with said counter wheel for zeroing the latter; a plastic wheel fixed coaxially to said counter wheel for rotation therewith; said ratchet wheel being fixed coaxially to said counter wheel for rotation therewith and said ratchet wheel being supported by said support means for axial and rotational movement; a toothed leaf spring fixed to said ratchet wheel and engaging said plastic wheel only when said ratchet wheel has moved along its axis to a predetermined position toward said plastic wheel, so that said counter wheel will turn with said ratchet wheel only when said ratchet wheel is in said predetermined axial position; a pin fixed to said ratchet wheel and extending into a magazine compartment of the camera to be engaged by introduction of a magazine into said compartment to move the ratchet wheel into said predetermined position upon introduction of a magazine into said compartment, whereby the counter wheel will be connected to the ratchet wheel for rotation therewith by introduction of a magazine into the camera; and a leaf spring carried by said support means and urging said ratchet wheel away from said position thereof to an idle position where the plastic wheel is not connected to the ratchet wheel for rotation therewith, said leaf spring including a projection which acts as a pawl and cooperates with said ratchet wheel to limit the latter at all times to one direction of rotation.

References Cited by the Examiner

UNITED STATES PATENTS

| | | | |
|---|---|---|---|
| 1,747,705 | 2/30 | Goldberg | 226—62 |
| 1,858,792 | 5/32 | Merle | 88—16 |
| 2,238,482 | 4/41 | Wittel | 88—16 |
| 2,294,250 | 8/42 | Sperry | 88—16 |
| 2,641,962 | 6/53 | Jungjohann | 226—62 |
| 2,979,985 | 4/61 | Bolsey | 88—16 |
| 3,032,002 | 5/62 | Keznickl | 88—16 X |

FOREIGN PATENTS

| | | |
|---|---|---|
| 656,760 | 2/38 | Germany. |
| 730,605 | 1/43 | Germany. |

NORTON ANSHER, *Primary Examiner.*

EMIL G. ANDERSON, GRANVILLE Y. CUSTER, *Examiners.*